(12) United States Patent
Sun et al.

(10) Patent No.: US 9,570,746 B2
(45) Date of Patent: Feb. 14, 2017

(54) OLIVINE-TYPE CATHODE ACTIVE MATERIAL PRECURSOR FOR LITHIUM BATTERY, OLIVINE-TYPE CATHODE ACTIVE MATERIAL FOR LITHIUM BATTERY, METHOD FOR PREPARING THE SAME AND LITHIUM BATTERY WITH THE SAME

(75) Inventors: Yang-Kook Sun, Seoul (KR); Sung-Woo Oh, Seoul (KR); Hyun-Joo Bang, Seoul (KR); Seung Min Oh, Gumi-si (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 834 days.

(21) Appl. No.: 12/933,907

(22) PCT Filed: Mar. 25, 2009

(86) PCT No.: PCT/KR2009/001522
§ 371 (c)(1),
(2), (4) Date: Oct. 22, 2010

(87) PCT Pub. No.: WO2009/120019
PCT Pub. Date: Oct. 1, 2009

(65) Prior Publication Data
US 2011/0027651 A1 Feb. 3, 2011

(30) Foreign Application Priority Data
Mar. 25, 2008 (KR) .................. 10-2008-0027401
Nov. 18, 2008 (KR) .................. 10-2008-0114796

(51) Int. Cl.
| | | |
|---|---|---|
| H01M 4/52 | (2010.01) | |
| H01M 4/58 | (2010.01) | |
| C01B 15/00 | (2006.01) | |
| C01B 25/45 | (2006.01) | |
| C01B 33/20 | (2006.01) | |
| C01B 33/22 | (2006.01) | |
| H01M 10/052 | (2010.01) | |
| H01M 4/02 | (2006.01) | |

(52) U.S. Cl.
CPC .......... *H01M 4/5825* (2013.01); *C01B 15/00* (2013.01); *C01B 25/45* (2013.01); *C01B 33/20* (2013.01); *C01B 33/22* (2013.01); *H01M 4/5815* (2013.01); *H01M 10/052* (2013.01); *H01M 4/582* (2013.01); *H01M 2004/021* (2013.01); *Y02E 60/122* (2013.01)

(58) Field of Classification Search
CPC ................ H01M 10/052; H01M 2004/021; H01M 4/5815; H01M 4/582; H01M 4/5825; C01B 15/00; C01B 25/45; C01B 33/20; C01B 33/22; Y02E 60/122
See application file for complete search history.

(56) References Cited

U.S. PATENT DOCUMENTS

| | | | |
|---|---|---|---|
| 2004/0033360 A1* | 2/2004 | Armand et al. .............. 428/408 |
| 2009/0142668 A1* | 6/2009 | Ishii ....................... G11B 5/596 |
| | | | 429/231.8 |
| 2010/0015514 A1* | 1/2010 | Miyagi et al. ................. 429/129 |

FOREIGN PATENT DOCUMENTS

| | | | |
|---|---|---|---|
| JP | 2005-047751 | 2/2005 | |
| KR | 10-2001-0020108 | 3/2001 | |
| KR | 10-0805875 | 2/2008 | |
| KR | 10-0805910 | 2/2008 | |
| KR | 10-0946387 | 3/2010 | |
| WO | WO 2007055087 A1 * | 5/2007 | ............. G01B 31/02 |

OTHER PUBLICATIONS

I. Belharouak, C. Johnson, K. Amine. Synthesis and electrochemical analysis of vapor-deposited carbon-coated LiFePO4, Electrochem. Comm. 2005, 7, 983-988.*

S. W. Oh, H. J. Bang, S.-T. Myung, Y. C. Bae, S.-M. Lee, Y.-K. Sun. The Effect of Morphological Properties on the Electrochemical Behavior of High Tap Density C—LiFePO4 Prepared via Coprecipitation, J. Electrochem. Soc. 115, (6), A414-A420, 2008.*

* cited by examiner

*Primary Examiner* — Carlos Barcena
(74) *Attorney, Agent, or Firm* — Lex IP Meister, PLLC

(57) ABSTRACT

The present invention provides an olivine-type positive active material precursor for a lithium battery that includes $MXO_{4-z}B_z$ (wherein M is one element selected from the group consisting of Fe, Ni, Co, Mn, Cr, Zr, Nb, Cu, V, Ti, Zn, Al, Ga, Mg, B, and a combination thereof, X is one element selected from the group consisting of P, As, Bi, Sb, and a combination thereof, B is one element selected from the group consisting of F, S, and a combination thereof, and $0 \leq z \leq 0.5$) particles, and the precursor has a particle diameter of 1 to 20 µm, a tap density of 0.8 to 2.1 g/cm$^3$, and a specific surface area of 1 to 10 m$^2$/g. The olivine-type positive active material prepared using the olivine-type positive active material precursor has excellent crystallinity of particles, a large particle diameter, and a high tap density, and therefore shows excellent electrochemical characteristics and capacity per unit volume.

4 Claims, 20 Drawing Sheets

OLIVINE-TYPE CATHODE ACTIVE MATERIAL PRECURSOR FOR LITHIUM BATTERY, OLIVINE-TYPE CATHODE ACTIVE MATERIAL FOR LITHIUM BATTERY, METHOD FOR PREPARING THE SAME AND LITHIUM BATTERY WITH THE SAME

TECHNICAL FIELD

The present invention relates to an olivine-type positive active material precursor for a lithium battery, an olivine-type positive active material for a lithium battery, a method of manufacturing the same, and a lithium battery including the same. The present invention relates to an olivine-type positive active material precursor for a lithium battery, which has excellent particle crystallinity and excellent electrochemical characteristics due to a high tap density, while it has a large particle size, and can provide an olivine-type positive active material with excellent capacity per unit volume, an olivine-type positive active material for a lithium battery, a method of manufacturing the same, and a lithium battery including the same.

BACKGROUND ART

Recently, there has been a remarkably increasing requirement of a battery that can be repeatedly charged and discharged as a power source for a portable information network electronic device such as a cellular phone, a personal digital assistant (PDA), a lap top computer, and the like, a portable electronic device such as a digital camera, a camcorder, an MP3 player, and the like, or an electric bike, an electric car, and the like. A commercially-available lithium battery includes $LiCoO_2$ at a positive electrode and carbon at a negative electrode.

However, since cobalt, a starting material of a positive active material, has a small reservoir and an environmental problem due to toxicity against a human body, an alternative positive material needs to be developed. Accordingly, there is active research on $LiNiO_2$, $LiCo_xNi_{1-x}O_2$, $LiMn_2O_4$, and the like as a positive active material. The $LiNiO_2$ having the same layered structure as $LiCoO_2$ is not yet commercially available, since it is hard to synthesize in a stoichiometric ratio and is thermally unstable. The $LiMn_2O_4$ is commercially used for some low-priced products. However, the $LiMn_2O_4$, a level 4V spinel positive active material, has an advantage of using manganese as a starting material but a structural change of Jahn-Teller distortion due to manganese $3^+$, resultantly bringing about a bad cycle-life characteristic.

Accordingly, a positive active material that is more economical and stable and has high capacity and an excellent cycle characteristic is required. A compound with an olivine structure has garnered attention to as a positive active material for a lithium battery. It may be represented by a Chemical Formula $Li_xM_yPO_4$ (herein, x is $0 < x \leq 2$, y is $0.8 \leq y \leq 1.2$, and M is a transition element belonging to Group 3d in the periodic table).

Japanese Patent Laid-Open Publication Pyeung 9-171827 discloses that $LiFePO_4$ is used for a positive electrode of a lithium ion battery among the compounds represented by $Li_xM_yPO_4$. $LiFePO_4$ is environment-friendly, has an abundant reservoir, and costs very little. In addition, it may realize low electric power and low voltage more easily than a conventional positive active material. It also has theoretical capacity of 170 mAh/g and thus excellent battery capacity.

However, the $LiFePO_4$ may not be controlled regarding particle size and shape in solid-phase reaction and wet reaction methods, in which olivine-type $FePO_4$, the precursor of the $LiFePO_4$, is synthesized. Thus, it may have no uniform particles. In other words, a new method of synthesizing an olivine-type positive active material suppressing a small specific surface area and having high volume energy density is required.

DISCLOSURE

Technical Problem

In order to solve the problems, the present invention provides an olivine-type positive active material precursor having excellent crystallinity of particles and a low specific surface area of powder particles.

Technical Solution

Another purpose of the present invention is to provide an olivine-type positive active material prepared using the olivine-type positive active material precursor.

Yet another purpose of the present invention is to provide a method of manufacturing the olivine-type positive active material for a lithium battery.

Still another purpose of the present invention is to provide a lithium battery including the olivine-type positive active material.

According to one embodiment of the present invention, an olivine-type positive active material precursor for a lithium battery includes $MXO_{4-z}B_z$ (wherein M is one element selected from the group consisting of Fe, Ni, Co, Mn, Cr, Zr, Nb, Cu, V, Ti, Zn, Al, Ga, Mg, B, and a combination thereof, X is one element selected from the group consisting of P, As, Bi, Sb, and a combination thereof, B is one element selected from the group consisting of F, S, and a combination thereof, and $0 \leq z \leq 0.5$) particles. The precursor has a particle diameter of 1 to 20 μm, a tap density of 0.8 to 2.1 $g/cm^3$, and a specific surface area of 1 to 10 $m^2/g$.

The olivine-type positive active material precursor may have a particle diameter of 3 to 18 μm and a tap density of 1.2 to 2.0 $g/cm^3$.

The olivine-type positive active material precursor may have a pore volume of $4 \times 10^{-2}$ to $12 \times 10^{-2}$ cc/g.

The olivine-type positive active material precursor may include a secondary particle prepared by aggregating $MXO_{4-z}B_z$ primary particles.

The primary particle may have a size of 100 to 200 nm.

The olivine-type positive active material precursor for a lithium battery may include a first carbon coating layer inside pores among the primary particles and a second carbon coating layer on the surface of the secondary particle.

The olivine-type positive active material precursor may include a secondary particle prepared by aggregating $MXO_{4-z}B_z$ primary particles, and the primary particles are uniformly coated with a carbon source.

The carbon source may be used in an amount of 0.1 to 10 wt % based on the amount of $MXO_{4-z}B_z$.

The primary particles may have a size of 50 to 200 nm, and the secondary particle may have a size of 5 to 20 μm.

The olivine-type positive active material precursor may include a carbon source dispersed inside the crystalline structure of the primary particles.

The carbon source may be used in an amount of 0.1 to 10 wt % based on the amount of $MXO_{4-z}B_z$.

The $MXO_{4-z}B_z$ may include iron phosphate.

According to another embodiment of the present invention, an olivine-type positive active material for a lithium battery is represented by the following Formula 1 and has a particle diameter of 1 to 20 μm, a tap density of 0.8 to 2.1 g/cm³, and a specific surface area of 1 to 10 m²/g:

$$Li_xM_yM'_zXO_{4-w}B_w$$ [Formula 1]

wherein M and M' are independently an element selected from the group consisting of Fe, Ni, Co, Mn, Cr, Zr, Nb, Cu, V, Mo, Ti, Zn, Al, Ga, Mg, B, and a combination thereof, X is an element selected from the group consisting of P, As, Bi, Sb, Mo, and a combination thereof, B is one element selected from the group consisting of F, S, and a combination thereof, $0<x\le1$, $0<y\le1$, $0<z\le1$, $0<x+y+z\le2$, and $0\le w\le0.5$.

The olivine-type positive active material may have a particle diameter of 3 to 18 μm and a tap density of 1.2 to 2.0 g/cm³.

The olivine-type positive active material may include a first carbon coating layer inside pores of the positive active material and a second carbon coating layer on the surface of the olivine-type positive active material.

The olivine-type positive active material may be selected from the group consisting of compounds represented by the following Formulas 2, 3, 4, and 5, and a combination thereof:

$$LiFe_{1-a}A_aPO_4$$ [Formula 2]

wherein A is an element selected from the group consisting of Ni, Co, Mn, Cr, Zr, Nb, Cu, V, Mo, Ti, Zn, Al, Ga, Mg, B, and a combination thereof, and $0\le a\le1$.

$$Li_{1-a}A_aFePO_4$$ [Formula 3]

wherein A is an element selected from the group consisting of Ni, Co, Mn, Cr, Zr, Nb, Cu, V, Mo, Ti, Zn, Al, Ga, Mg, B, and a combination thereof, and $0\le a<1$, $$LiFe_{1-a}A_aPO_{4-z}B_z$$ [Formula 4]

wherein A is an element selected from the group consisting of Ni, Co, Mn, Cr, Zr, Nb, Cu, V, Mo, Ti, Zn, Al, Ga, Mg, B, and a combination thereof, B is one element selected from the group consisting of F, S, and a combination thereof, $0\le a\le1$, and $0.01\le z\le0.5$, and $$Li_{1-a}A_aFePO_{4-z}B_z$$ [Formula 5]

wherein A is an element selected from the group consisting of Ni, Co, Mn, Cr, Zr, Nb, Cu, V, Mo, Ti, Zn, Al, Ga, Mg, B, and a combination thereof, B is one element selected from the group consisting of F, S, and a combination thereof, $0\le a<1$, and $0.01\le z\le0.5$.

The positive electrode precursor may include a uniformly dispersed carbon source.

According to another embodiment of the present invention, a method of manufacturing an olivine-type positive active material for a lithium battery includes: preparing M-X including hydrate by mixing M containing compound (wherein M is an element selected from the group consisting of Fe, Ni, Co, Mn, Cr, Zr, Nb, Cu, V, Mo, Ti, Zn, Al, Ga, Mg, B, and a combination thereof), X containing compound (wherein X is an element P, As, Bi, Sb, Mo, and a combination thereof), and a pH controller in a solvent; drying the M-X including hydrate under vacuum; primary firing the M-X including hydrate to form M-X precursor; mixing the M-X precursor and a lithium including compound; and secondary firing the mixture of the M-X precursor and lithium including compound to form a positive active material.

The pH controller may include one selected from the group consisting of an ammonium aqueous solution, a carbonate gas, an OH group-containing compound, and a combination thereof.

The M-X including hydrate may be prepared at pH 1.5 to 8.0.

The M-X including hydrate may be prepared using the M-containing and X-containing compounds, until they reach a total mole concentration ranging from 0.5 to 2.5M.

The preparation of the M-X including hydrate may further include addition of a B-containing compound (B is an element selected from the group consisting of F, S, and a combination thereof).

The M-X precursor may be coated with carbon before mixing the M-X precursor with a lithium-containing compound.

The carbon may be coated by dispersing 0.1 to 10 parts by weight of a carbon precursor based on 100 parts by weight of the M-X precursor to prepare a coating solution in an organic solvent, adding an M-X precursor in the coating solution to prepare a mixed solution, and agitating the mixed solution until the organic solvent is evaporated.

The carbon precursor may include one selected from the group consisting of pitch, carbon nanofiber, sucrose, glucose, polyvinyl alcohol (PVA), polyvinylpyrrolidone (PVP), colloidal carbon, citric acid, tartaric acid, glycolic acid, polyacrylic acid, adipic acid, glycine, and a combination thereof.

According to another embodiment of the present invention, a method of manufacturing an olivine-type positive active material precursor for a lithium battery includes: preparing M-X including hydrate by mixing M containing compound (wherein M is an element selected from the group consisting of Fe, Ni, Co, Mn, Cr, Zr, Nb, Cu, V, Ti, Zn, Al, Ga, Mg, B, and a combination thereof), X containing compound (wherein X is an element selected from the group consisting of P, As, Bi, Sb, and a combination thereof), a carbon precursor, and a pH controller in a solvent to prepare a M-X including hydrate; drying the M-X including hydrate under vacuum; and firing the vacuum-dried M-X including hydrate.

The M containing compound may be selected from the group consisting of M containing acetate, M containing nitrate, M containing sulfate, M containing carbonate, M containing citrate, M containing phthalate, M containing perchlorate, M containing acetylacetonate, M containing acrylate, M containing formate, M containing oxalate, M containing halide, M containing oxyhalide, M containing boride, M containing oxide, M containing sulfide, M containing peroxide, M containing alkoxide, M containing hydroxide, M containing ammonium, M containing acetylacetone, hydrates thereof, and a combination thereof.

The M containing compound may be selected from the group consisting of iron ethylene diammonium sulfate, titanium bis(ammonium lactato) dihydroxide, magnesium monoperoxyphthalate, aluminum phenoxide, boric acid, boron trifluoride diethyl etherate, boron trifluoride-propanol, hydrates thereof, and a combination thereof.

The X containing compound may be selected from the group consisting of X containing acetate, X containing nitrate, X containing sulfate, X containing citrate, X containing perchlorate, X containing halide, X containing oxyhalide, X containing oxide, X containing sulfide, X containing alkoxide, hydrates thereof, and a combination thereof.

The X containing compound may be selected from the group consisting of phosphoric acid, bismuth neodecanoate, hydrates thereof, and a combination thereof.

The carbon precursor may selected from the group consisting of pitch, carbon nanofiber, sucrose, glucose, polyvinyl alcohol (PVA), polyvinylpyrrolidone (PVP), colloidal carbon, citric acid, tartaric acid, glycolic acid, polyacrylic acid, adipic acid, glycine, and a combination thereof.

The carbon precursor may be added so that the carbon source of the M-X hydrate may be included in an amount of 0.1 to 10 wt % based on the amount of the M-X hydrate.

The pH controller may include one selected from the group consisting of an ammonium aqueous solution, a carbonate gas, an OH group-containing compound, and a combination thereof.

The preparation of the M-X including hydrate may further include addition of a B containing compound (B is an element selected from the group consisting of F, S, and a combination thereof).

The B containing material may include one selected from the group consisting of nickel fluoride, iron fluoride, cobalt fluoride, manganese fluoride, chromium fluoride, zirconium fluoride, niobium fluoride, copper fluoride, vanadium fluoride, titanium fluoride, zinc fluoride, aluminum fluoride, gallium fluoride, manganese fluoride, boron fluoride, $NH_4F$, LiF, $AlF_3$, S, $Li_2S$, hydrates thereof, and a combination thereof.

According to still another embodiment of the present invention, provided is a lithium battery including the olivine-type positive active material.

Advantageous Effects

The olivine-type positive active material prepared using the olivine-type positive active material precursor has excellent particle crystallinity, a large particle diameter, and high tap density and therefore shows excellent electrochemical characteristics and capacity per unit volume.

BEST MODE

Figure 1:
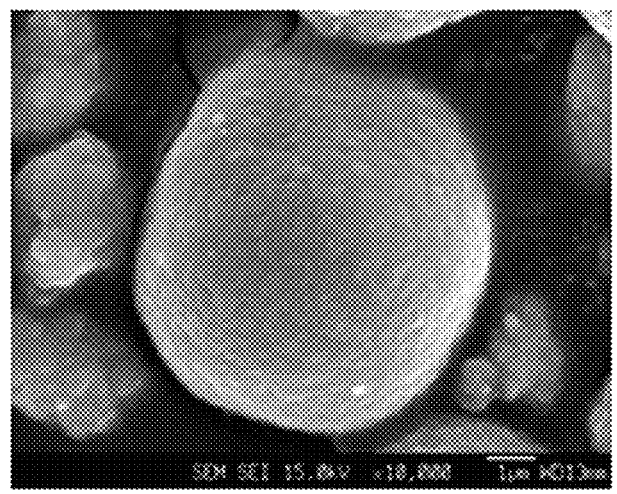
FIG. 1 is a scanning electron microscope (SEM) photograph showing iron phosphate prepared according to Example 1.
Figure 2:
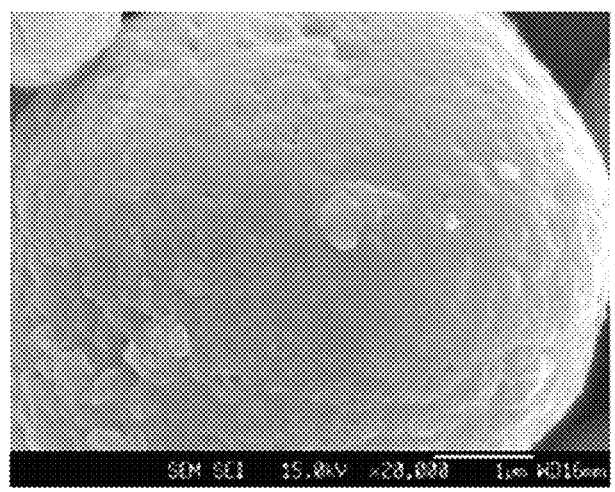
FIG. 2 is a scanning electron microscope (SEM) photograph showing carbon-coated iron phosphate prepared according to Example 3.
Figure 3:
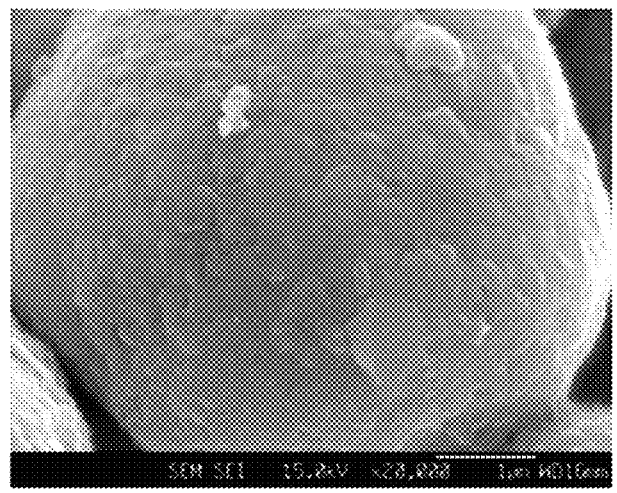
FIG. 3 is a scanning electron microscope (SEM) photograph showing carbon-coated iron phosphate prepared according to Example 4.
Figure 4:
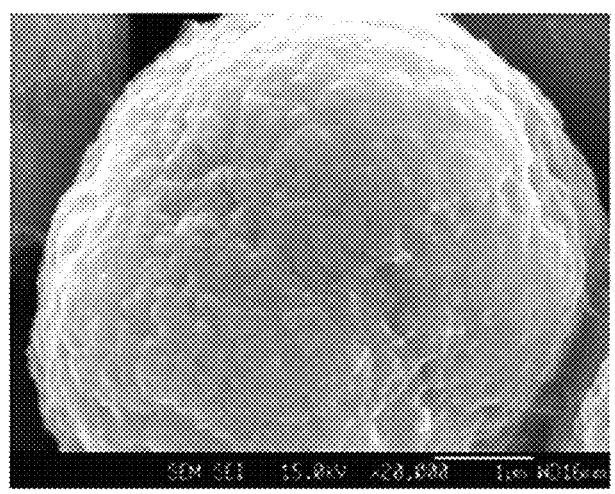
FIG. 4 is a scanning electron microscope (SEM) photograph showing carbon-coated iron phosphate prepared according to Example 5.

According to one embodiment of the present invention, an olivine-type positive active material precursor for a lithium battery is provided, which includes MXO$_{4-z}$B$_z$ (wherein M is one element selected from the group consisting of Fe, Ni, Co, Mn, Cr, Zr, Nb, Cu, V, Ti, Zn, Al, Ga, Mg, B, and a combination thereof, X is one element selected from the group consisting of P, As, Bi, Sb, and a combination thereof, B is one element selected from the group consisting of F, S, and a combination thereof, and 0≤z≤0.5) particles, and has a particle diameter of 1 to 20 μm, a tap density of 0.8 to 2.1 g/cm$^3$, and a specific surface area of 1 to 10 m$^2$/g.

The olivine-type positive active material precursor may be mixed with a lithium-containing compound. Then, the mixture is fired to provide an olivine-type positive active material for a lithium battery.

The olivine-type positive active material precursor may have a particle diameter of 1 to 20 μm, preferably of 3 to 18 μm, and more preferably of 5 to 15 μm. When the olivine-type positive active material precursor has a particle diameter ranging from 1 to 20 μm, it is harder and heavier than a nano-sized particle and may not be broken and distorted and thus may be well-prepared into a positive active material.

The olivine-type positive active material precursor may have tap density ranging from 0.8 to 2.1 g/cm$^3$, preferably from 1.0 to 2.0 g/cm$^3$, and more preferably from 1.2 to 2.0 g/cm$^3$. When it has tap density ranging from 1.0 to 2.1 g/cm$^3$, it may have less side reaction with an electrolyte solution but increased capacity per volume.

It has a specific surface area ranging from 1 to 10 m$^2$/g, preferably from 1.1 to 8 m$^2$/g, and more preferably from 1.2 to 6 m$^2$/g. When the olivine-type positive active material precursor has a specific surface area of less than 1 m$^2$/g, it may have too small an area contacting with an electrolyte, deteriorating electrochemical characteristics of a battery. When it has a specific surface area of bigger than 10 m$^2$/g, its secondary particle may have too small a particle diameter. Thus, it may deteriorate tap density and brings about small capacity per unit volume, which restricts commercial availability for a lithium secondary battery. In addition, when the olivine-type positive active material precursor has a specific surface area within the range, it may have pores among primary particles therein and make lithium ions smoothly intercalate/deintercalate due to the pores even though it is coated with a lithium source and carbon and sintered.

The olivine-type positive active material precursor may preferably have a pore volume ranging from 4×10$^{-2}$ to 12×10$^{-2}$ cc/g, more preferably from 4.5×10$^{-2}$ to 11×10$^{-2}$ cc/g, and much more preferably from 7×10$^{-2}$ to 10×10$^{-2}$ cc/g. When the olivine-type positive active material precursor has a pore volume ranging from 4×10$^{-2}$ to 12×10$^{-2}$ cc/g, it may realize a porous property inside the particle and thus facilitate lithium ion diffusion.

The olivine-type positive active material precursor may be a secondary particle made by aggregating primary particles, such as nano-sized MXO$_{4-z}$B$_z$. Herein, the carbon source may be dispersed inside the crystalline structure of the primary particle. Herein, the primary particle may have a size ranging from 100 to 200 nm. When the primary particle has a size within the range, a secondary particle prepared through aggregation of the primary particles may have a large size but high tap density and a large specific surface area.

The olivine-type positive active material precursor for a lithium battery may include a first carbon coating layer inside pores among the primary particles, and a second carbon coating layer on the surface of the secondary particle. In this way, when a secondary particle includes a carbon coating layer thereinside, it may improve electrochemical characteristics of an olivine-type positive active material.

The olivine-type positive active material precursor may include a micrometer-sized secondary particle including aggregated nanometer-sized MXO$_{4-z}$B$_z$ primary particles. The primary particles are uniformly coated with a carbon source. Herein, the primary particles may have a size of 50 to 200 nm, while the secondary particle has a size of 5 to 20 μm.

The olivine-type positive active material precursor is preferably spherically shaped. Herein, the spherical shape may include a circle, an oval, and the like. When a positive active material for a rechargeable lithium battery is prepared using the spherical-shaped olivine-type positive active material precursor, an olivine-type positive active material may be spherical-shaped.

The MXO$_{4-z}$B$_z$ may preferably include iron phosphate.

According to another embodiment of the present invention, the olivine-type positive active material for a lithium battery is represented by the following Formula 1, and has a particle diameter of 1 to 20 μm, a tap density of 0.8 to 2.1 g/cm$^3$, and a specific surface area of 1 to 10 m$^2$/g.

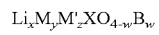

$$Li_xM_yM'_zXO_{4-w}B_w \qquad \text{[Formula 1]}$$

Herein, M and M' are independently an element selected from the group consisting of Fe, Ni, Co, Mn, Cr, Zr, Nb, Cu, V, Mo, Ti, Zn, Al, Ga, Mg, B, and a combination thereof, X is an element selected from the group consisting of P, As, Bi, Sb, Mo, and a combination thereof, B is one element selected from the group consisting of F, S, and a combination thereof, 0<x≤1, 0<y≤1, 0<z≤1, 0<x+y+z≤2, and 0≤w≤0.5.

The olivine-type positive active material may have a particle diameter of 1 to 20 μm, preferably 3 to 18 μm, and more preferably 5 to 15 μm. When the olivine-type positive active material has a particle diameter of less than 1 μm, it may have low tap density and thus a problem of being prepared into an electrode. When it has a particle diameter of more than 20 μm, it may have higher tap density but too small a specific surface area and thus too small an area contacting with an electrolyte solution and a problem of having a bad influence on intercalation and deintercalation of Li ions.

The olivine-type positive active material has tap density ranging from 0.8 to 2.1 g/cm$^3$, preferably from 1.0 to 2.0 g/cm$^3$, and more preferably from 1.2 to 2.0 g/cm$^3$. When the olivine-type positive active material has tap density of less than 0.8 g/cm$^3$, it may have too low a tap density to be prepared into an electrode. When it has tap density of more than 2.1 g/cm$^3$, it may have a particle diameter of larger than 20 μm, deteriorating battery capacity.

The olivine-type positive active material may preferably have a specific surface area ranging from 1 to 10 m$^2$/g, more preferably from 1.1 to 8 m$^2$/g, and much more preferably from 1.2 to 6 m$^2$/g. When it has a specific surface area within the range, it may have excellent particle crystallinity and high tap density as well as a large particle diameter, excellent electrochemical characteristics, and excellent capacity per unit volume.

The olivine-type positive active material is preferably spherically shaped. Herein, the spherical shape may include a circle, an oval, and the like, but is not limited thereto. The olivine-type positive active material may have a spherical shape due to the spherically shaped olivine-type positive active material precursor.

The olivine-type positive active material may preferably include a first carbon coating layer in pores of the positive active material and a second carbon coating layer on the surface of the olivine-type positive active material. When the olivine-type positive active material includes the first and second carbon coating layers, it may improve lithium diffusion speed and thus electrochemical characteristics.

In addition, the olivine-type positive active material may be uniformly coated with a carbon source.

The olivine-type positive active material may be selected from the group consisting of compounds represented by the following Formula 2, 3, 4, and 5, and a combination thereof.

LiFe$_{1-a}$A$_a$PO$_4$     [Formula 2]

Herein, A is an element selected from the group consisting of Ni, Co, Mn, Cr, Zr, Nb, Cu, V, Mo, Ti, Zn, Al, Ga, Mg, B, and a combination thereof, and $0 \leq a \leq 1$.

Li$_{1-a}$A$_a$FePO$_4$     [Formula 3]

Herein, A is an element selected from the group consisting of Ni, Co, Mn, Cr, Zr, Nb, Cu, V, Mo, Ti, Zn, Al, Ga, Mg, B, and a combination thereof, and $0 \leq a < 1$.

LiFe$_{1-a}$A$_a$PO$_{4-z}$B$_z$     [Formula 4]

Herein, A is an element selected from the group consisting of Ni, Co, Mn, Cr, Zr, Nb, Cu, V, Mo, Ti, Zn, Al, Ga, Mg, B, and a combination thereof, B is one element selected from the group consisting of F, S, and a combination thereof, $0 \leq a \leq 1$, and $0.01 \leq z \leq 0.5$.

Li$_{1-a}$A$_a$FePO$_{4-z}$B$_z$     [Formula 5]

Herein, A is an element selected from the group consisting of Ni, Co, Mn, Cr, Zr, Nb, Cu, V, Mo, Ti, Zn, Al, Ga, Mg, B, and a combination thereof, B is one element selected from the group consisting of F, S, and a combination thereof, $0 \leq a < 1$, and $0.01 \leq z \leq 0.5$.

According to another embodiment of the present invention, a method of manufacturing an olivine-type positive active material for a lithium battery may include: preparing M-X including hydrate by mixing M-containing compound (wherein M is an element selected from the group consisting of Fe, Ni, Co, Mn, Cr, Zr, Nb, Cu, V, Mo, Ti, Zn, Al, Ga, Mg, B, and a combination thereof), X-containing compound (wherein X is an element P, As, Bi, Sb, Mo, and a combination thereof), and a pH controller in a solvent; drying the M-X including hydrate under vacuum; primary firing the vacuum-dried M-X including hydrate to form an M-X precursor; mixing the M-X precursor with a lithium including compound; and secondary firing the mixture of the M-X precursor and lithium including compound to form a positive active material.

According to the method of manufacturing the olivine-type positive active material for a lithium battery, an olivine-type positive active material for a lithium battery may be represented by the above Formula 1 and have a particle diameter ranging from 1 to 20 μm, tap density ranging from 0.8 to 2.1 g/cm$^3$, and a specific surface area ranging from 1 to 10 m$^2$/g.

The M-X precursor may preferably include MXO$_{4-z}$B$_z$ (wherein M is an element selected from the group consisting of Fe, Ni, Co, Mn, Cr, Zr, Nb, Cu, V, Mo, Ti, Zn, Al, Ga, Mg, B, and a combination thereof, X is an element selected from the group consisting of P, As, Bi, Sb, Mo, and a combination thereof, B is one element selected from the group consisting of F, S, and a combination thereof, and ($0 \leq z \leq 0.5$) particles. The M-X precursor is mixed with a lithium-containing compound and is fired to provide an olivine-type positive active material for a lithium battery.

First, the M containing compound, X containing compound, and pH controller are added to a solvent and mixed at a speed ranging from 1100 to 1500 rpm to prepare an M-X including hydrate.

The M containing compound may be selected from the group consisting of M containing acetate, M containing nitrate, M containing sulfate, M containing carbonate, M containing citrate, M containing phthalate, M containing perchlorate, M containing acetylacetonate, M containing acrylate, M containing formate, M containing oxalate, M containing halide, M containing oxyhalide, M containing boride, M containing oxide, M containing sulfide, M containing peroxide, M containing alkoxide, M containing hydroxide, M containing ammonium, M containing acetylacetone, hydrates thereof, and a combination thereof.

The M containing compound may be selected from the group consisting of iron ethylene diammonium sulfate, titanium bis(ammonium lactato) dihydroxide, magnesium monoperoxyphthalate, aluminum phenoxide, boric acid, boron trifluoride diethyl etherate, boron trifluoride-propanol, hydrates thereof, and a combination thereof.

The X containing compound may be selected from the group consisting of X containing acetate, X containing nitrate, X containing sulfate, X containing citrate, X containing perchlorate, X containing halide, X containing oxyhalide, X containing oxide, X containing sulfide, X containing alkoxide, hydrates thereof, and a combination thereof.

The X containing compound may be selected from the group consisting of phosphoric acid, bismuth neodecanoate, hydrates thereof, and a combination thereof.

The pH controller may preferably include one selected from the group consisting of an ammonium aqueous solution, carbonate gas, an OH group-containing compound, and a combination thereof, and preferably the OH group-containing compound is NaOH.

The solvent is preferably water.

The solution prepared by adding the M-containing and X-containing compounds and the pH controller in the solvent may preferably have pH ranging from 1.5 to 8.0, and more preferably from 2.1 to 5.0. When the solution has pH within the range, the M-containing compound may react with the X-containing compound in a ratio of 1:1. However, when it has pH out of the range, it may non-preferably include impurities such as Fe$_2$O$_3$, Fe(OH)$_2$, and Fe(OH)$_2$(PO$_4$)$_2$.

The M-X including hydrate may be prepared using the M-containing and X-containing compounds so that they may have a total mole concentration ranging from 0.5 to 2.5M. When the M-containing and X-containing compounds have an entire mole concentration within the range, a precursor may have high tap density and a spherical shape.

The solution may be prepared by mixing the M-containing and X-containing compounds and the pH controller in the solvent at a speed ranging from 1100 to 1500 rpm, and preferably from 1200 to 1400 rpm. When the M-containing and X-containing compounds and the pH controller are mixed in the solvent within the speed range, a positive active material precursor particle may have high tap density and a spherical shape.

The mixing may be preferably performed for 12 to 24 hours. When the mixing is performed for less than 12 hours, an M-X including hydrate particle may not be uniform. When performed for more than 24 hours, an M-X including hydrate particle may have shapes other than a spherical shape.

The preparation of the M-X including hydrate may further include adding a B containing compound (B is an element selected from the group consisting of F, S, and a combination thereof).

The B containing material may include one selected from the group consisting of nickel fluoride, iron fluoride, cobalt fluoride, manganese fluoride, chromium fluoride, zirconium fluoride, niobium fluoride, copper fluoride, vanadium fluoride, titanium fluoride, zinc fluoride, aluminum fluoride, gallium fluoride, manganese fluoride, boron fluoride, $NH_4F$, LiF, $AlF_3$, S, $Li_2S$, hydrates thereof, and a combination thereof.

The M-X including hydrate is washed with distilled water and vacuum-dried at a temperature ranging from 50 to 90° C. for 12 to 24 hours to completely remove impurities.

When the vacuum-drying is performed at a temperature of lower than 50° C., it may take a long time to completely remove moisture chemically absorbed inside the M-X including hydrate particle. When it is performed at a temperature of 90° C. or higher, an M-X including hydrate may be oxidized under an unstable vacuum status. In addition, when the vacuum-drying is performed for less than 12 hours, it may not completely remove moisture chemically absorbed inside an M-X including hydrate particle. When it is performed for more than 24 hours, an M-X including hydrate particle may be completely dry, non-preferably wasting time.

The vacuum-dried M-X including hydrate is primarily fired, preparing an M-X precursor.

The primary firing may be performed at a temperature ranging from 450 to 600° C. When the primary firing is performed at a temperature of lower than 450° C., an M-X precursor may hardly be formed into a crystal. When it is performed at a temperature of 600° C. or higher, it may waste cost and time.

In addition, the primary firing is preferably performed for 5 to 20 hours. When the primary firing is performed for 5 hours or less, an M-X precursor may not have good crystallinity. When performed for 20 hours, it may waste cost and time.

The M-X precursor is mixed with a lithium-containing compound. The mixture is secondarily fired, preparing a positive active material.

The lithium-containing compound may include one selected from the group consisting of lithium hydroxide, lithium fluoride, lithium nitrate, lithium carbonate, and a combination thereof.

The secondary firing may be performed at a temperature ranging from 600 to 850° C. When the secondary firing is performed at a temperature of lower than 600° C., it may deteriorate capacity of a positive active material. When it is performed at 850° C. or higher, it may also deteriorate capacity.

In addition, the secondary firing may be preferably performed for 10 to 20 hours. When it is performed for 10 hours or less, M in an M-X precursor may not be completely reduced. When it is performed for 20 hours or more, it may waste time, non-preferably consuming reduction gas.

According to another embodiment of the present invention, the prepared M-X precursor may be additionally carbon coated, before being mixed with a lithium including compound.

The carbon-coating may include dispersing a carbon precursor in an amount ranging from 0.1 to 10 parts by weight into an organic solvent based on 100 parts by weight of an M-X precursor to prepare a coating solution, preparing a mixed solution by adding an M-X precursor to the coating solution, and agitating the mixed solution until the organic solvent is evaporated.

When a carbon precursor is dispersed in an amount of 0.1 parts by weight into 100 parts by weight of an M-X precursor, it may not be coated all over the precursor particle, deteriorating electrochemical characteristics of a positive active material. When it is dispersed in an amount of 10 parts by weight, too much carbon may be included and thus the lithium diffusion speed may be slowed and the electrochemical characteristics of a positive active material may be deteriorated.

The organic solvent may be selected from the group consisting of tetrahydrofuran (THF), N-methylpyrrolidone (NMP), benzene, and a combination thereof.

The mixed solution may be agitated using a magnetic bar or an impeller. The mixed solution is agitated until the organic solvent is evaporated.

In addition, the carbon coating may include mixing 0.1 to 10 parts by weight of a carbon precursor with 100 parts by weight of an M-X precursor and ball-milling the mixture at a speed of 80 to 200 rpm.

When the ball-milling is performed at a speed of less than 80 rpm, carbon and M-X precursors may not be well mixed and thus not good for coating. When it is performed at a speed of more than 200 rpm, precursors may be non-preferably broken.

The ball-milling may be preferably performed for 3 to 24 hours. When it is performed for less than 3 hours, a carbon precursor may not be uniformly coated on an M-X precursor. When it is performed for more than 24 hours, it may be less economical, since the coating is already complete.

The carbon precursor may include one selected from the group consisting of pitch, carbon nanofiber, sucrose, glucose, polyvinyl alcohol (PVA), polyvinylpyrrolidone (PVP), colloidal carbon, citric acid, tartaric acid, glycolic acid, polyacrylic acid, adipic acid, glycine, and a combination thereof, and more preferably pitch.

When the carbon-coated M-X precursor is used to prepare an olivine-type positive active material, the olivine-type positive active material may have better electrochemical characteristics than one prepared by using an M-X precursor with no carbon coating.

According to another embodiment of the present invention, a method of manufacturing an olivine-type positive active material includes: mixing an M-containing compound (wherein M is an element selected from the group consisting of Fe, Ni, Co, Mn, Cr, Zr, Nb, Cu, V, Ti, Zn, Al, Ga, Mg, B, and a combination thereof), an X-containing compound (wherein X is an element selected from the group consisting of P, As, Bi, Sb, and a combination thereof), a carbon precursor, and a pH controller in a solvent to prepare an M-X including hydrate; vacuum-drying the M-X including hydrate; and firing the vacuum-dried M-X including hydrate.

The M-X including hydrate may be prepared by including a carbonized material, a carbon precursor. In other words, the carbon precursor is used to prepare an M-X including hydrate, preparing an olivine-type positive active material precursor having better crystallinity than a conventional olivine-type positive active material precursor, and also having less impurities and a high tap density.

First of all, an M containing compound, an X containing compound, a carbon precursor, and a pH controller are added to a solvent and then mixed therewith, preparing the M-X including hydrate.

The M containing compound may be selected from the group consisting of M containing acetate, M containing nitrate, M containing sulfate, M containing carbonate, M containing citrate, M containing phthalate, M containing perchlorate, M containing acetylacetonate, M containing acrylate, M containing formate, M containing oxalate, M containing halide, M containing oxyhalide, M containing boride, M containing oxide, M containing sulfide, M containing peroxide, M containing alkoxide, M containing hydroxide, M containing ammonium, M containing acetylacetone, hydrates thereof, and a combination thereof.

The M containing compound may be selected from the group consisting of iron ethylene diammonium sulfate, titanium bis(ammonium lactato) dihydroxide, magnesium monoperoxyphthalate, aluminum phenoxide, boric acid, boron trifluoride diethyl etherate, boron trifluoride-propanol, hydrates thereof, and a combination thereof.

The X containing compound may be selected from the group consisting of X containing acetate, X containing nitrate, X containing sulfate, X containing citrate, X containing perchlorate, X containing halide, X containing oxyhalide, X containing oxide, X containing sulfide, X containing alkoxide, hydrates thereof, and a combination thereof.

The X containing compound may be preferably selected from the group consisting of phosphoric acid, bismuth neodecanoate, hydrates thereof, and a combination thereof.

The carbon precursor may be selected from the group consisting of pitch, carbon nanofiber, sucrose, glucose, polyvinyl alcohol (PVA), polyvinylpyrrolidone (PVP), colloidal carbon, citric acid, tartaric acid, glycolic acid, polyacrylic acid, adipic acid, glycine, and a combination thereof. In addition, a carbon precursor may be added until the carbon source exists on a final M-X hydrate in an amount ranging from 0.1 to 10 wt % based on the entire amount of the M-X hydrate. When the carbon source is included in an amount of less than 0.1 wt %, carbon may not be coated on a primary particle inside a precursor but is entangled together, forming a grain boundary. Accordingly, the grain boundary may suppress intercalation/deintercalatation of lithium ions, deteriorating electrochemical characteristics. When it is included in an amount of more than 10 wt %, too much carbon may be coated inside a precursor, forming too thick a carbon coating layer on a final material. Accordingly, lithium ions may not be well intercalated/deintercalated, deteriorating electrochemical characteristics.

The pH controller may preferably include one selected from the group consisting of an ammonium aqueous solution, carbonate gas, an OH group-containing compound, and a combination thereof, and more preferably the OH group-containing compound is NaOH. The solvent is preferably water.

The M-X including hydrate may be prepared at pH ranging from 1.5 to 9.0. When it is prepared within the pH range, M and X may preferably have an atom ratio close to 1:1 in an olivine-type positive active material precursor. In addition, the pH controller may preferably have a concentration ranging from 1 to 10M and more preferably from 2 to 5M.

The M-X including hydrate may be prepared by mixing the components for 6 to 100 hours. When the mixing is performed for less than 6 hours, a positive active material precursor particle may not have a spherical shape and may have a problem of low tap density. When it is performed for more than 100 hours, a positive active material precursor particle may have too large a size, having a bad influence on electrochemical characteristics.

The preparation of the M-X including hydrate may further include addition of a B containing compound (B is an element selected from the group consisting of F, S, and a combination thereof).

The B containing material may include one selected from the group consisting of nickel fluoride, iron fluoride, cobalt fluoride, manganese fluoride, chromium fluoride, zirconium fluoride, niobium fluoride, copper fluoride, vanadium fluoride, titanium fluoride, zinc fluoride, aluminum fluoride, gallium fluoride, manganese fluoride, boron fluoride, $NH_4F$, LiF, $AlF_3$, S, $Li_2S$, hydrates thereof, and a combination thereof.

The M-X including hydrate may be prepared by blowing a gas selected from the group consisting of $N_2$ gas, Ar gas, and a combination thereof into a reactor while M-containing and X-containing compounds are mixed together. When $N_2$ gas or Ar gas is injected into a reactor, an M-X including compound particle may have a smaller size and also higher tap density.

The M-X including hydrate is washed with distilled water and dried at a temperature ranging from 50 to 90° C. for 12 to 24 hours under vacuum pressure of −65 cmHg or less, completely removing impurities. The vacuum pressure may be in a range from −70 to −76 cmHg.

When the vacuum-drying is performed at 50° C. or lower, it may take long time to completely remove moisture chemically absorbed inside an M-X including hydrate particle. When it is performed at 90° C. or higher, an M-X including hydrate may be oxidized under an unstable vacuum state. In addition, when the vacuum-drying is performed for 12 hours or less, it may not completely remove moisture chemically absorbed inside an M-X including hydrate particle. When it is performed for more than 24 hours, it may waste time since an M-X including hydrate has already been completely dry. In addition, if the vacuum-dry pressure is more than −65 cmHg, it may not completely remove impurities inside an M-X including hydrate particle.

The vacuum-dried M-X including hydrate is fired, preparing an olivine-type positive active material precursor.

The M-X including hydrate may be fired at a temperature ranging from 450 to 600° C. When it is fired at 450° C. or less, a positive active material precursor may be amorphous. When it is fired at 600° C. or higher, a positive active material precursor may have high crystallinity. When a positive active material precursor has high crystallinity, an M-X including precursor may not be well reduced when prepared into a positive active material.

In addition, the firing may be performed for 5 to 30 hours. When the firing is performed for less than 5 hours, a positive active material precursor may not have high crystallinity. When it is performed for more than 30 hours, it may not be economical since the firing has already been complete.

In addition, the M-X including hydrate may be heated to the firing temperature at a speed ranging from 1 to 5° C./min. Primary particles include a carbon source around themselves and are entangled together into a secondary particle, and thus the M-X including hydrate is prepared. Further, when the heat is too rapidly increased during the firing, carbon sources may be carbonized too quickly, breaking the spherical shape of a particle and resultantly deteriorating tap density.

The M-X including hydrate may be fired in the air or under a reduction atmosphere. When it is fired under a reduction atmosphere, a positive active material precursor may have fewer impurities. The reduction atmosphere may be selected from the group consisting of nitrogen gas, argon gas, a mixed gas of argon/hydrogen, and a combination thereof.

When an olivine-type positive active material precursor is prepared according to the manufacturing method, it may include fewer impurities and have better crystallinity than a conventional olivine-type positive active material precursor. In addition, an olivine-type positive active material precursor according to the embodiment of the present invention may be mixed with a lithium-containing compound, preparing a positive active material for a rechargeable lithium battery.

According to another embodiment of the present invention, a lithium battery including the olivine-type positive active material is provided.

The lithium battery including the olivine-type positive active material may include a positive electrode including a positive active material according to one embodiment of the present invention, a negative electrode including a negative active material, and a separator therebetween. In addition, it may include an electrolyte impregnating the positive and negative electrodes and the separator.

The negative active material may reversibly intercalate and deintercalate lithium ions. For example, it may include artificial graphite, natural graphite, graphitized carbon fiber, amorphous carbon, and the like. A lithium metal may be used as a negative active material. The electrolyte may be a liquid including a lithium salt and a non-aqueous organic solvent or a polymer gel.

MODE FOR INVENTION

Hereinafter, an exemplary embodiment of the present invention will be illustrated in detail, but does not limit the present invention.

Preparation of a Positive Active Material

Example 1

Four liters of distilled water were put in a co-precipitation reactor (4 L capacity, a spinning motor with output of more than 90 W), and 2M of an iron nitrate aqueous solution, 2M of a $H_3PO_4$ aqueous solution, and ammonium hydroxide were added thereto. Herein, an iron nitrate aqueous solution and a phosphate salt aqueous solution were supplied at a speed of 1 L/hr until iron nitrate and phosphate salt had a mole concentration of 2M in the reactor, and then ammonium hydroxide with a concentration of 6M was added thereto to maintain pH of 2.1 in the reactor.

The reactor was maintained to have a temperature of 55° C. The reactant mixture therein was agitated for co-precipitation at a speed of 1100 rpm. The reactant was controlled to stay 20 hours on average in the reactor. When the reaction reached a peak, a spherically shaped iron phosphate hydrate was continuously acquired through an overflow pipe.

The prepared iron phosphate hydrate was dried under a vacuum atmosphere at 70° C. for 24 hours and fired under a reduction atmosphere at 550° C. for 15 hours, preparing iron phosphate.

The iron phosphate was mixed with lithium carbonate ($Li_2CO_3$) in a mole ratio of 1:1, and 3 parts by weight of sucrose as a carbon source was added thereto. The mixture was heated at a speed of 2 to 5° C./min and calcinated at 800° C. for 15 hours, preparing a $LiFePO_4$ positive active material powder with an olivine structure.

Example 2

Four liters of distilled water were put in a co-precipitation reactor (4 L capacity, a spinning motor with an output of more than 90 W), and 2M of iron nitrate aqueous solution, 2M of a $H_3PO_4$ aqueous solution, and ammonium hydroxide were added thereto. Herein, the iron nitrate aqueous solution and the phosphate salt aqueous solution were supplied at a speed of 1 L/hr until iron nitrate and phosphate salt had a concentration of 2 M in the reactor. The ammonium hydroxide with a concentration of 6M was supplied therewith, so that the reactant in the reactor maintained pH of 2.1.

The reactant mixture in the reactor was maintained at 55° C. and agitated for co-precipitation at a speed of 1100 rpm. The reactant was controlled to stay 20 hours on average. When the reaction reached a peak, a spherically shaped iron phosphate hydrate was continuously prepared through an overflow pipe.

The iron phosphate hydrate was dried under a vacuum atmosphere at 70° C. for 24 hours and fired under a reduction atmosphere at 550° C. for 15 hours, preparing iron phosphate.

The iron phosphate was mixed with lithium carbonate ($Li_2CO_3$) in a mole ratio of 1:1, and 2 parts by weight of sucrose as a carbon source was heated at a speed of 2 to 5° C./min and calcinated at 800° C. for 15 hours, preparing a $LiFePO_4$ positive active material powder with an olivine structure.

Comparative Example 1

Four liters of distilled water were put in a co-precipitation reactor (4 L capacity, a spinning motor with an output of more than 90 W), and an iron nitrate aqueous solution, a $H_3PO_4$ aqueous solution, and ammonium hydroxide were added thereto. Herein, the iron nitrate aqueous solution and the $H_3PO_4$ aqueous solution were supplied therewith to have an entire mole concentration of 2.0M at a speed of 0.1 to 1 L/hr in the reactor. In addition, the ammonium hydroxide with a concentration ranging from 2 to 5M/L was supplied therewith to maintain pH of 2.1 in the reactor.

The reactor was maintained to be in a temperature ranging from 30° C. to 70° C. The reactant was agitated for co-precipitation at a speed ranging from 800 to 1000 rpm. In addition, the reactant was controlled to stay for 12 hours on average in the reactor. When the reaction reached a peak, a spherically shaped iron phosphate hydrate was continuously prepared through an overflow pipe.

The prepared iron phosphate hydrate was dried under a vacuum atmosphere at a temperature ranging from 50 to 90° C. for 24 hours.

The iron phosphate hydrate was acquired under a reduction atmosphere at 550° C. for 10 hours, preparing iron phosphate.

The iron phosphate was mixed with lithium carbonate ($Li_2CO_3$) in a mole ratio of 1:1 and then heated at a speed of 2 to 5° C./min and calcinated at 800° C. for 15 hours, preparing a $LiFePO_4$ positive active material powder with an olivine structure.

Comparative Example 2

Four liters of distilled water were put in a co-precipitation reactor (4 L capacity, a spinning motor with an output of more than 90 W), and an iron nitrate aqueous solution, a $H_3PO_4$ aqueous solution, and ammonium hydroxide were added thereto. Herein, the iron nitrate aqueous solution and the $H_3PO_4$ aqueous solution were supplied at a speed of 0.1 to 1 L/hr, until iron nitrate and $H_3PO_4$ aqueous solution had an entire mole concentration of 2.0M in the reactor. In addition, the ammonium hydroxide with a concentration of 2 to 5M/L was added thereto to maintain pH of 2.1 in the reactor.

The reactor was maintained in a temperature range of 30° C. to 70° C., and the reactant was agitated for co-precipitation at a speed of 800 to 1000 rpm. The reactant was controlled to stay for 12 hours on average in the reactor. When the reaction reached a peak, a spherically shaped iron phosphate hydrate was continuously acquired through an overflow pipe.

The iron phosphate hydrate was dried under a vacuum atmosphere at a temperature ranging from 50 to 90° C. for 24 hours.

The iron phosphate hydrate was fired under a reduction atmosphere at 550° C. for 10 hours, acquiring iron phosphate.

The iron phosphate was mixed with lithium carbonate ($Li_2CO_3$) in a mole ratio of 1:1. The mixture was heated at a speed of 2 to 5° C./min and calcinated at 650° C. for 15 hours, preparing $LiFePO_4$ positive active material powder with an olivine structure.

Example 3

Four liters of distilled water were put in a co-precipitation reactor (4 L capacity, a spinning motor with an output of more than 90 W), and 2M of an iron nitrate aqueous solution, 2M of a $H_3PO_4$ aqueous solution, and ammonium hydroxide were supplied thereto. Herein, the iron nitrate aqueous solution and the phosphate salt aqueous solution were supplied at a speed of 1 L/hr, so that iron nitrate and phosphate salt might have an entire concentration of 2M. The ammonium hydroxide with a concentration of 6M was added thereto to maintain pH of 2.1 in the reactor.

The reactor was maintained at 55° C. The reactant was agitated for co-precipitation at a speed of 1200 rpm. In addition, the reactant was controlled to stay for 24 hours on average in the reactor. When the reaction reached a peak, a spherically shaped iron phosphate hydrate was continuously acquired through an overflow pipe.

The iron phosphate hydrate was dried under a vacuum atmosphere at 70° C. for 24 hours and fired under a reduction atmosphere at 550° C. for 15 hours, preparing iron phosphate.

Next, 2 parts by weight of pitch was dispersed into N-methylpyrrolidone based on 100 parts by weight of the iron phosphate. The iron phosphate was added to the pitch dispersed in N-methylpyrrolidone. The mixture was agitated until the N-methylpyrrolidone was all evaporated, preparing iron phosphate coated with carbon.

The carbon-coated iron phosphate was mixed with lithium carbonate ($Li_2CO_3$) in a mole ratio of 1:1. The mixture was heated at a speed of 2 to 5° C./min and calcinated at 800° C. for 15 hours, preparing a $LiFePO_4$ positive active material powder with an olivine structure.

Example 4

Four liters of distilled water were put in a co-precipitation reactor (4 L capacity, a spinning motor with an output of more than 90 W), and 2M of an iron nitrate aqueous solution, 2M of a $H_3PO_4$ aqueous solution, and ammonium hydroxide were added thereto. The iron nitrate aqueous solution and the phosphate salt aqueous solution were supplied at a speed of 1 L/hr, until iron nitrate and phosphate salt had an entire mole concentration of 2M in the reactor. The ammonium hydroxide with a concentration of 6M was added thereto to maintain pH of 2.1 in the reactor.

The reactor was maintained at 55° C. The reactant was agitated for co-precipitation at a speed of 1200 rpm. In addition, the reactant was controlled to stay for 24 hours on average in the reactor. When the reaction reached a peak, iron phosphate hydrate was continuously acquired through an overflow pipe.

The iron phosphate hydrate was dried under a vacuum atmosphere at 70° C. for 24 hours and then fired under a reduction atmosphere at 550° C. for 15 hours, acquiring iron phosphate.

Next, 2 parts by weight of pitch was dispersed into tetrahydrofuran (THF) based on 100 parts by weight of the iron phosphate. Then, the iron phosphate was added to the pitch dispersed into THF. The mixture was agitated until the THE was all evaporated, preparing iron phosphate coated with carbon.

The carbon-coated iron phosphate was mixed with lithium carbonate ($Li_2CO_3$) in mole ratio of 1:1. The mixture was heated at a speed of 2 to 5° C./min and calcinated at 800° C. for 15 hours, preparing a $LiFePO_4$ positive active material powder with an olivine structure.

Example 5

Four liters of distilled water were put in a co-precipitation reactor (4 L capacity, a spinning motor with an output of more than 90 W), and 2M of an iron nitrate aqueous solution, 2M of a $H_3PO_4$ aqueous solution, and ammonium hydroxide were added thereto. The iron nitrate aqueous solution and the phosphate salt aqueous solution were supplied at a speed of 1 L/hr until iron nitrate and phosphate salt had an entire mole concentration of 2M in the reactor, and the ammonium hydroxide with 6M of a concentration was added thereto to maintain pH of 2.1 therein.

The reactor was maintained at 55° C., and the reactant was agitated for co-precipitation at a speed of 1200 rpm. The reactant was controlled to stay for 24 hours at an average in the reactor. When the reaction reached a peak, a spherically shaped iron phosphate hydrate was acquired through an overflow pipe.

The prepared iron phosphate hydrate was dried under a vacuum atmosphere at 70° C. for 24 hours and fired under a reduction atmosphere at 550° C. for 15 hours, acquiring iron phosphate.

Next, 2 parts by weight of pitch was added to 100 parts by weight of the iron phosphate. The mixture was mixed at a speed of 150 rpm for 12 hours in a ball-milling method, preparing a carbon-coated iron phosphate.

The carbon-coated iron phosphate was mixed with lithium carbonate ($Li_2CO_3$) in a mole ratio of 1:1 and then heated at a speed of 2 to 5° C./min and calcinated at 800° C. for 15 hours, preparing a $LiFePO_4$ positive active material powder with an olivine structure.

Example 6

Four liters of distilled water were put in a co-precipitation reactor (4 L capacity, a spinning motor with an output of more than 90 W), and 2.0M of an iron nitrate aqueous solution, 2.0M of an $H_3PO_4$ an aqueous solution, and ammonium hydroxide were added thereto. The iron nitrate aqueous solution and the phosphate salt aqueous solution were supplied at a speed of 1 L/hr until iron nitrate and phosphate salt had an entire mole concentration of 2.0M, and sucrose was added thereto as a carbon precursor. The ammonium hydroxide with a concentration of 6M was added thereto to maintain pH of 2.1 in the reactor.

The reactor was maintained in a temperature range from 30 to 70° C. The reactant was agitated for co-precipitation at a speed of 800 to 1000 rpm. In addition, the reactant was controlled to stay for 6 to 12 hours on average in the reactor. When the reaction reached a peak, a spherically shaped iron phosphate hydrate was continuously acquired through an overflow pipe.

The iron phosphate hydrate was dried under a vacuum atmosphere at 70° C. for 24 hours.

The iron phosphate hydrate was fired under a reduction atmosphere at 550° C. for 10 hours, acquiring iron phosphate.

Next, 2 parts by weight of pitch was dispersed into N-methylpyrrolidone based on 100 parts by weight of the iron phosphate. The iron phosphate was added to the pitch dispersed into N-methylpyrrolidone. The mixture was agitated until the N-methylpyrrolidone was all evaporated, preparing a carbon-coated iron phosphate.

The carbon-coated iron phosphate was mixed with lithium carbonate ($Li_2CO_3$) in a mole ratio of 1:1. The mixture was heated at a speed of 2 to 5° C./min and calcinated at 750° C. for 15 hours, preparing a $LiFePO_4$ positive active material powder with an olivine structure.

Example 7

A $LiFePO_4$ positive active material powder with an olivine structure was prepared according to the same method as Example 6, except for adding glucose instead of sucrose to prepare an iron phosphate hydrate.

Comparative Example 3

A $LiFePO_4$ positive active material powder with an olivine structure was prepared according to the same method as Example 6, except for adding no sucrose to prepare an iron phosphate hydrate.

Measurement of Particle Diameter, Tap Density, and Specific Surface Area of an M-X Precursor and an Olivine-Type Positive Active Material First of all, the M-X precursor and olivine-type positive active material according to Examples 1 to 5 and Comparative Examples 1 and 2 were measured regarding particle diameter, tap density, and specific surface area. The results are provided in the following Table 1. The specific surface area was measured by a BET method (Brunauer-Emmett-Teller method).

TABLE 1

| | | Diameter (μm) | Tap density (g/cm³) | Specific surface area (m²/g) |
|---|---|---|---|---|
| Example 1 | M-X precursor | 5-7 | 1.42 | 3.57 |
| | olivine-type positive active material | 5-6.5 | 1.45 | 3 |
| Example 2 | M-X precursor | 4.5-8 | 1.45 | 6.43 |
| | olivine-type positive active material | 5-7 | 1.47 | 6 |

TABLE 1-continued

| | | Diameter (μm) | Tap density (g/cm³) | Specific surface area (m²/g) |
|---|---|---|---|---|
| Example 3 | M-X precursor | 5-8 | 1.43 | 5.68 |
| | olivine-type positive active material | 5-8 | 1.48 | 5.6 |
| Example 4 | M-X precursor | 5-8.5 | 1.43 | 5.93 |
| | olivine-type positive active material | 5-8.5 | 1.48 | 5.8 |
| Example 5 | M-X precursor | 5-8.5 | 1.47 | 5.6 |
| | olivine-type positive active material | 5-8.5 | 1.5 | 5.4 |
| Comparative Example 1 | M-X precursor | 5-10 | 1.44 | 0.7 |
| | olivine-type positive active material | 5-10 | 1.45 | 0.5 |
| Comparative Example 2 | M-X precursor | 0.8-1.2 | 1.07 | 27 |
| | olivine-type positive active material | 0.8-1.1 | 1.08 | 25 |

Next, when the iron phosphate of Example 6 reached a reaction peak, a spherically shaped iron phosphate hydrate acquired through an overflow pipe was measured regarding particle diameter and tap density depending on time. The results are provided in Table 2.

TABLE 2

| | Particle diameter (μm) | Tap density (g/cm³) |
|---|---|---|
| 6 hours | 3 to 4 | 1.4 to 1.47 |
| 12 hours | 3 to 4.5 | 1.4 to 1.5 |
| 16 hours | 4 to 5 | 1.5 to 1.53 |
| 20 hours | 5 to 6 | 1.5 to 1.55 |
| 24 hours | 5 to 7 | 1.5 to 1.6 |
| 30 hours | 3 to 10 | 1.56 to 1.62 |
| 40 hours | 3 to 12 | 1.52 to 1.65 |
| 44 hours | 4 to 13 | 1.5 to 1.63 |
| 60 hours | 4.5 to 15 | 1.55 to 1.6 |
| 64 hours | 4 to 15 | 1.5 to 1.78 |
| 70 hours | 3 to 17 | 1.52 to 1.65 |
| 84 hours | 5 to 19 | 1.48 to 1.6 |
| 100 hours | 3 to 20 | 1.41 to 1.5 |

Referring to Table 2, the iron phosphate of Example 6 had a particle diameter ranging from 3 to 20 μm and tap density ranging from 1.4 to 1.65 g/cm³.

Measurement of Specific Surface Area and Pore Volume of the Prepared Positive Active Material Precursors The iron phosphate according to Example 6 and Comparative Example 3 were measured regarding specific surface area and pore volume. The results are provided in Table 3.

TABLE 3

| | Specific surface area (m²/g) | Pore volume (cc/g) |
|---|---|---|
| Example 6 | 5.71 | $7.127 \times 10^{-2}$ |
| Comparative Example 3 | 5.64 | $6.665 \times 10^{-2}$ |

Referring to Table 3, when a carbon precursor was included when preparing a precursor, it had an increased specific surface area and pore volume. In other words, when a heat-treated precursor is coated with pitch, the pitch is well-absorbed in a material with a large pore volume, improving electrochemical characteristics of an olivine-type positive active material.

Scanning Electron Microscope Observation of the Prepared M-X Precursor and Positive Active Material Powder First of all, the iron phosphates according to Examples 1 and 3 to 5 and Comparative Example 1 were observed with a scanning electron microscope (SEM, Model No. JSM 6400, JEOL Ltd.).

Figure 5:
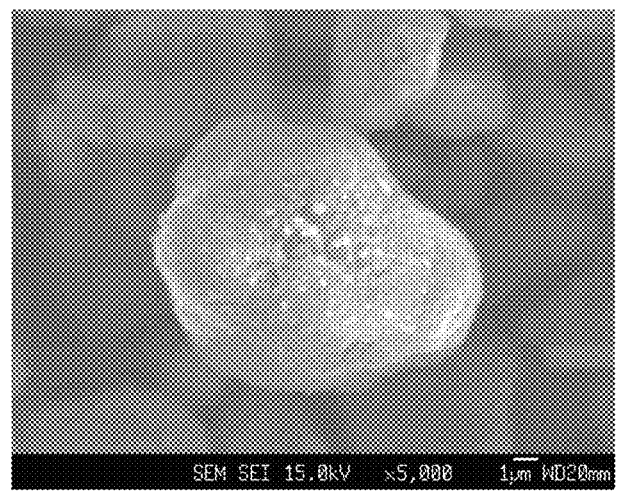
FIG. 5 is a scanning electron microscope (SEM) photograph showing iron phosphate prepared according to Comparative Example 1.

FIGS. 1 to 4 respectively show the scanning electron microscope photographs of the iron phosphates according to Examples 1 and 3 to 5. FIG. 5 shows the scanning electron microscope photograph of the iron phosphate according to Comparative Example 1.

Referring to FIGS. 1 and 5, the iron-phosphates in FIGS. 1 to 4 had a particle diameter ranging from 10 to 20 µm, while the iron phosphate of FIG. 5 had a particle diameter of less than 10 µm. In addition, the iron phosphate of FIG. 1 had a more spherical shape than the one of FIG. 5.

The olivine-type positive active material powders according to Examples 3 to 5 and Comparative Example 1 were observed with a scanning electron microscope. FIGS. 6 to 9 respectively show the scanning electron microscope photographs of the olivine-type positive active material powders prepared according to Examples 3 to 5 and Comparative Example 1.

Figure 6:
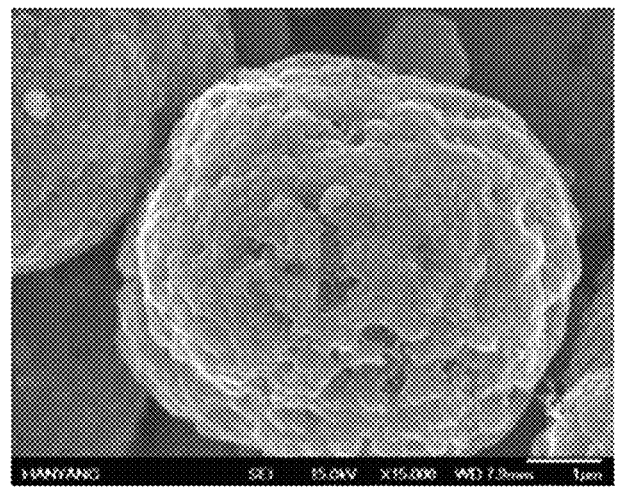
FIG. 6 is a scanning electron microscope (SEM) photograph showing an olivine-type positive active material powder prepared according to Example 3.
Figure 7:
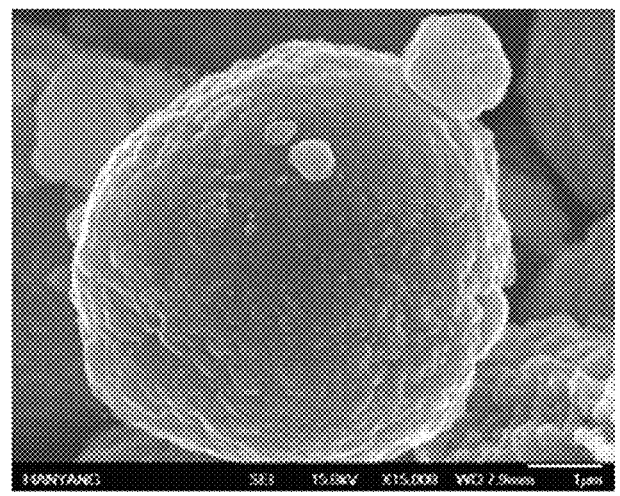
FIG. 7 is a scanning electron microscope (SEM) photograph showing an olivine-type positive active material powder prepared according to Example 4.
Figure 8:
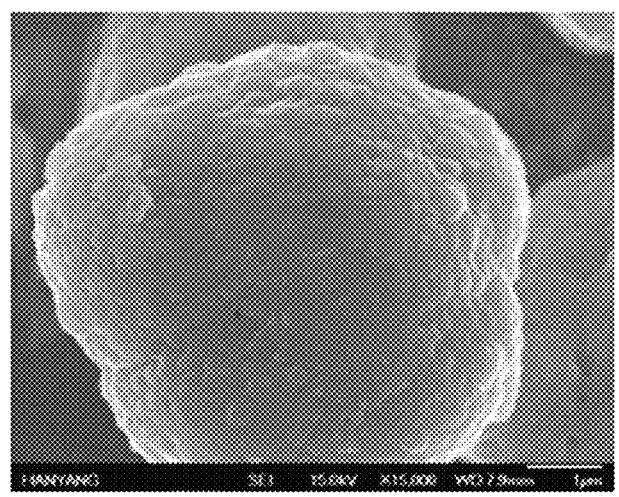
FIG. 8 is a scanning electron microscope (SEM) photograph showing an olivine-type positive active material powder prepared according to Example 5.

Referring to FIGS. 6 to 8, even though the olivine-type positive active material powder was carbon-coated, it had a primary particle ranging from 100 to 150 nm, which was identified with a scanning electron microscope. In addition, the positive active material powder was identified to have a spherical shape with a size ranging from 8 to 10 µm.

Figure 9:
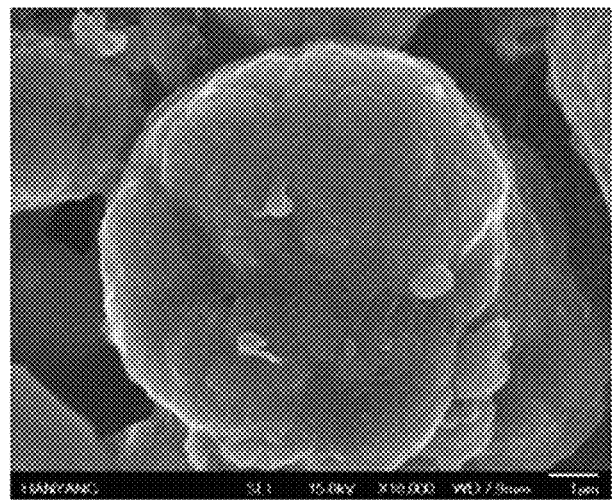
FIG. 9 is a scanning electron microscope (SEM) photograph showing an olivine-type positive active material powder prepared according to Comparative Example 1.

However, referring to FIG. 9, the positive active material powder had a primary particle ranging from 1 to 2 µm and a spherical shape with a size ranging from 8 to 10 µm.

Scanning Electron Microscope Observation of the Prepared Positive Active Material Precursor The iron phosphate hydrate of Example 6 was observed with a scanning electron microscope (SEM, Model No. JSM 6400 JEOL Ltd.). The result is provided in FIG. 10.

Figure 10:
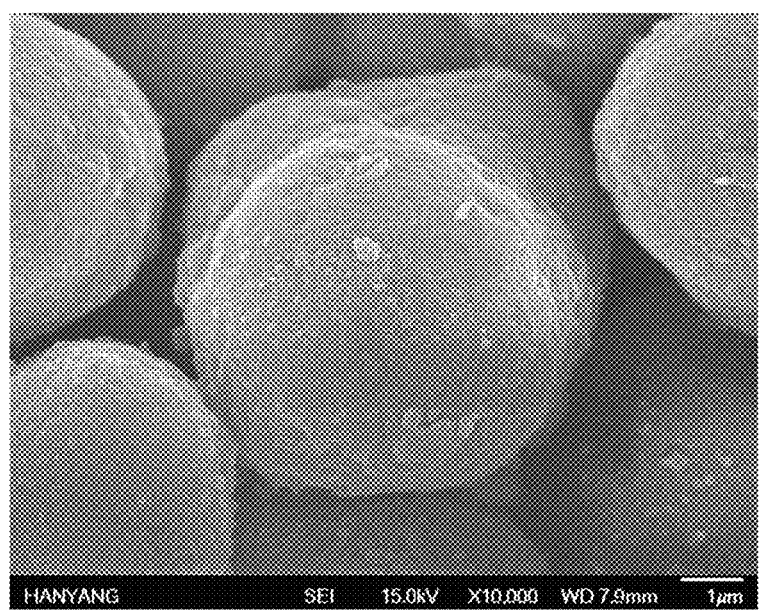
FIG. 10 is a scanning electron microscope (SEM) photograph showing iron phosphate hydrate prepared according to Example 6.

Referring to FIG. 10, the iron phosphate hydrate particle of Example 6 had a particle diameter ranging from 5 to 10 µm.

Figure 11:
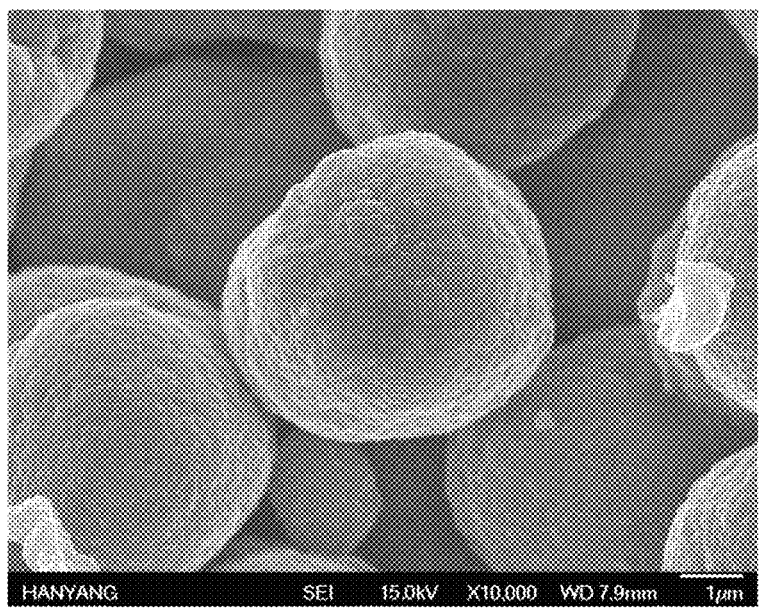
FIG. 11 is a scanning electron microscope (SEM) photograph showing iron phosphate prepared according to Example 6.
Figure 12:
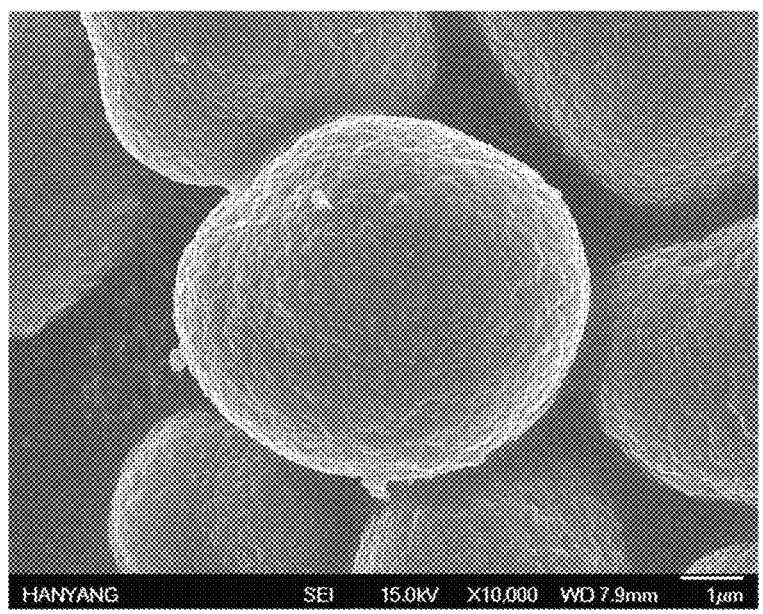
FIG. 12 is a scanning electron microscope (SEM) photograph showing iron phosphate prepared according to Example 7.
Figure 13:
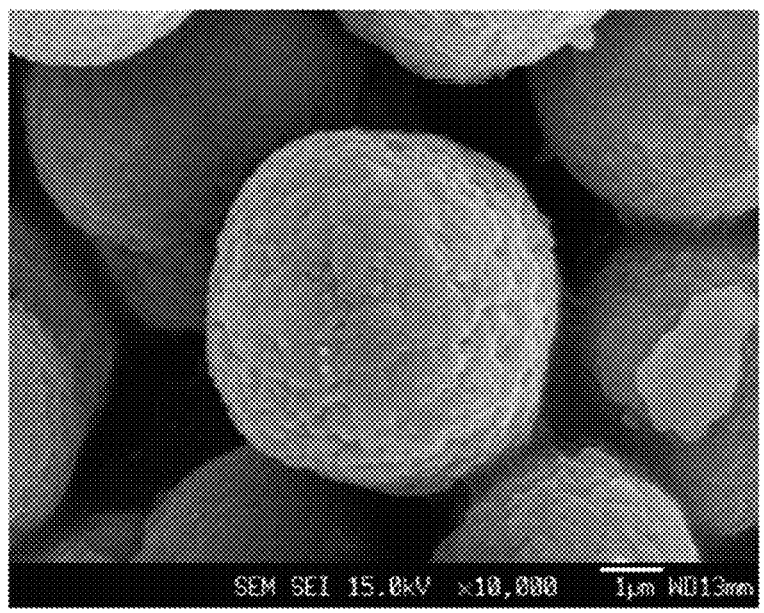
FIG. 13 is a scanning electron microscope (SEM) photograph showing iron phosphate prepared according to Comparative Example 3.

In addition, FIGS. 11 to 13 show the scanning electron microscope photographs of the iron phosphate according to Examples 6 and 7 and Comparative Example 3. Referring to FIGS. 11 and 12, the iron phosphate of Examples 6 and 7 had a smooth particle surface. Referring to FIG. 13, the iron phosphate of Comparative Example 3 had a rougher particle surface than the ones of Examples 6 and 7. The reason is that a carbon precursor was included to prepare a particle and carbonized during the heat treatment, making the surface of the particle smooth.

Figure 14:
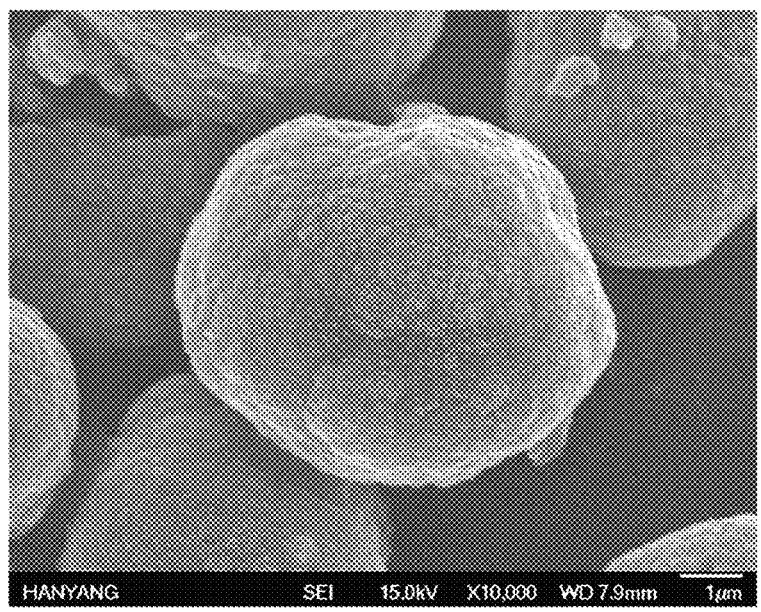
FIG. 14 is a scanning electron microscope (SEM) photograph showing $LiFePO_4$ prepared according to Example 6.
Figure 15:
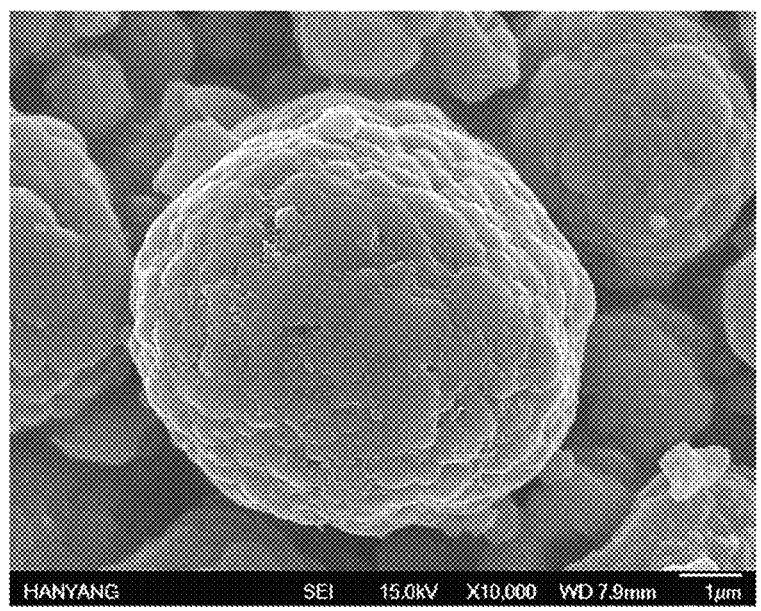
FIG. 15 is a scanning electron microscope (SEM) photograph showing $LiFePO_4$ prepared according to Example 7.
Figure 16:
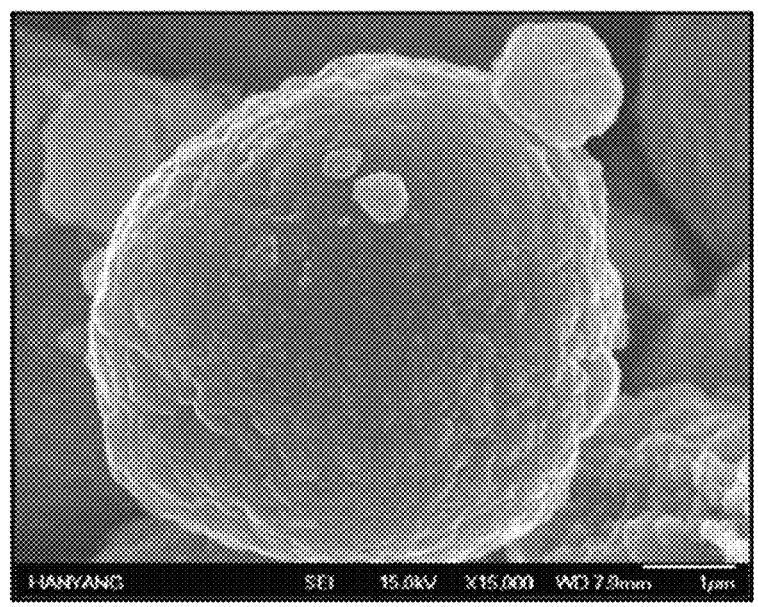
FIG. 16 is a scanning electron microscope (SEM) photograph showing $LiFePO_4$ prepared according to Comparative Example 3.

FIGS. 14 to 16 show the scanning electron microscope photographs of $LiFePO_4$ prepared according to Examples 6 and 7 and Comparative Example 3.

FIGS. 14 and 15 show small carbon particles around the $LiFePO_4$ particle, while FIG. 16 shows a smooth surface. The reason is that different kinds of carbons were included therein.

Figure 17:
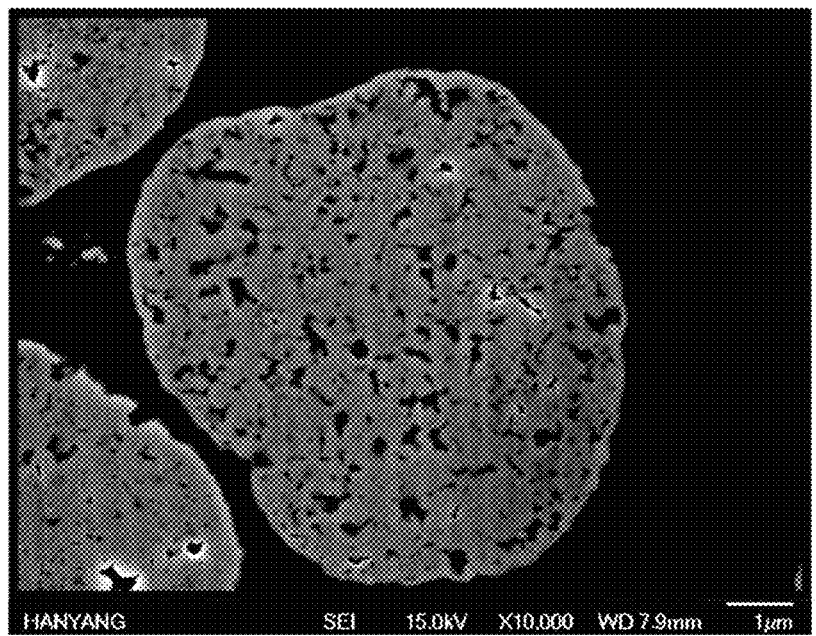
FIG. 17 is a scanning electron microscope (SEM) photograph showing a cross-sectional view of a $LiFePO_4$ particle prepared according to Example 6.
Figure 18:
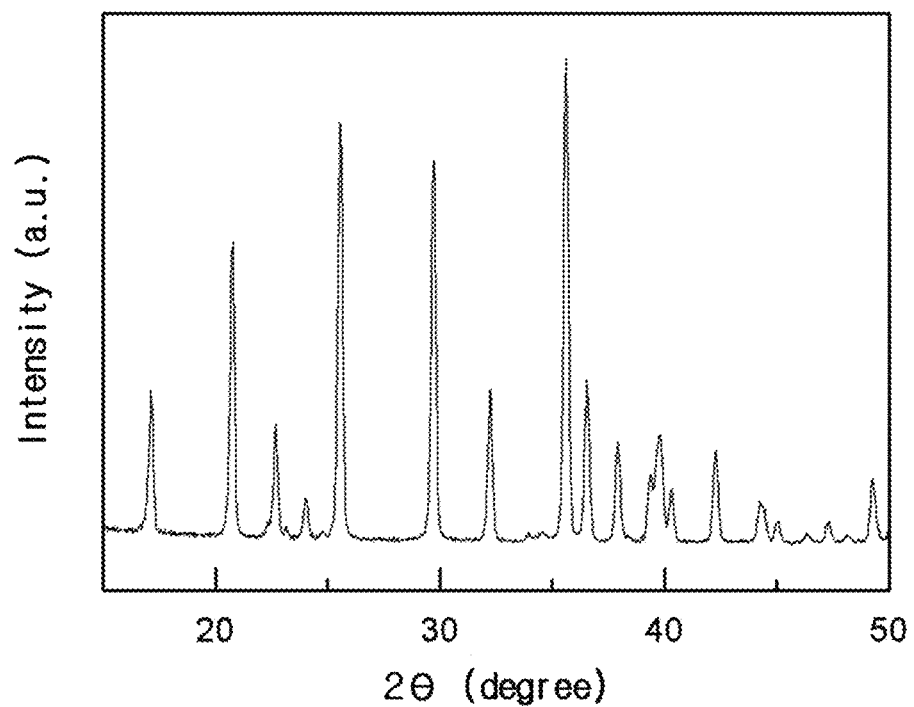
FIG. 18 is a graph showing X-ray diffraction analysis (XRD) results of the olivine-type positive active material powder prepared according to Example 3.
Figure 19:
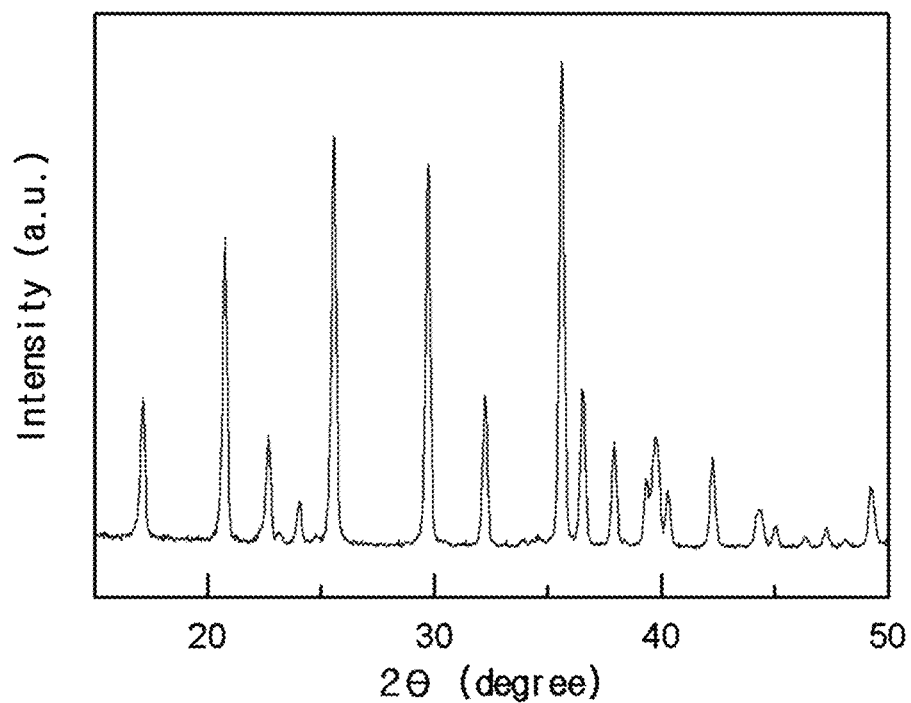
FIG. 19 is a graph showing X-ray diffraction analysis (XRD) results of the olivine-type positive active material powder prepared according to Example 4.
Figure 20:
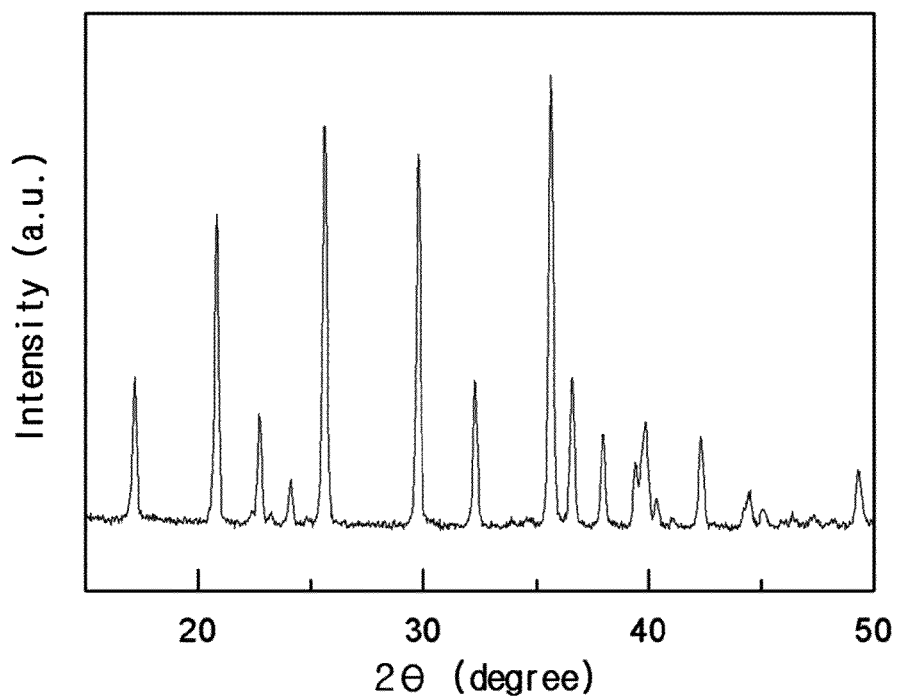
FIG. 20 is a graph showing X-ray diffraction analysis (XRD) results of the olivine-type positive active material powder prepared according to Example 5.
Figure 21:
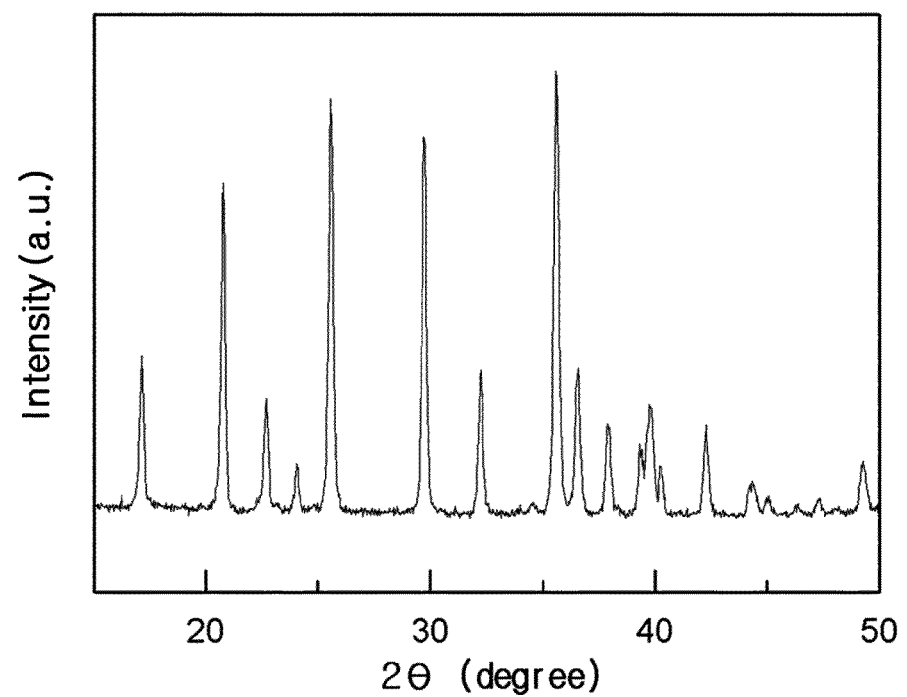
FIG. 21 is a graph showing X-ray diffraction analysis (XRD) results of the olivine-type positive active material powder prepared according to Comparative Example 1.

FIG. 17 is a scanning electron microscope photograph showing the cross-sectional view of the $LiFePO_4$ particle according to Example 6. Referring to this, the $LiFePO_4$ particle of Example 6 was identified to have empty spaces inside the particle. The empty spaces were filled with carbon filled among the particles, remarkably improving electrical conductivity, which is the biggest drawback of an olivine-type positive active material.

X-ray Diffraction Analysis of the Prepared Iron Phosphate and Positive Active Material Powder The olivine-type positive active materials according to Examples 3 to 5 and Comparative Example 1 were analyzed through X-ray diffraction (XRD, Model No. Rint-2000, Rigaku Co.). The results are respectively provided in FIGS. 18 to 21.

Referring to FIGS. 18 to 21, the positive active materials of Examples 3 to 5 and Comparative Example 1 had the same peak as Card No. 40-1499 of JCPDS (Joint Committee on Powder Diffraction Standards) and thus were identified to be $LiFePO_4$, which has an olivine structure.

Next, the $LiFePO_4$ according to Examples 6 and 7 and Comparative Example 3 were analyzed through X-ray diffraction (XRD, Model No. Rint-2000, Rigaku Co.). The results are respectively provided in FIGS. 22 to 24.

Figure 22:
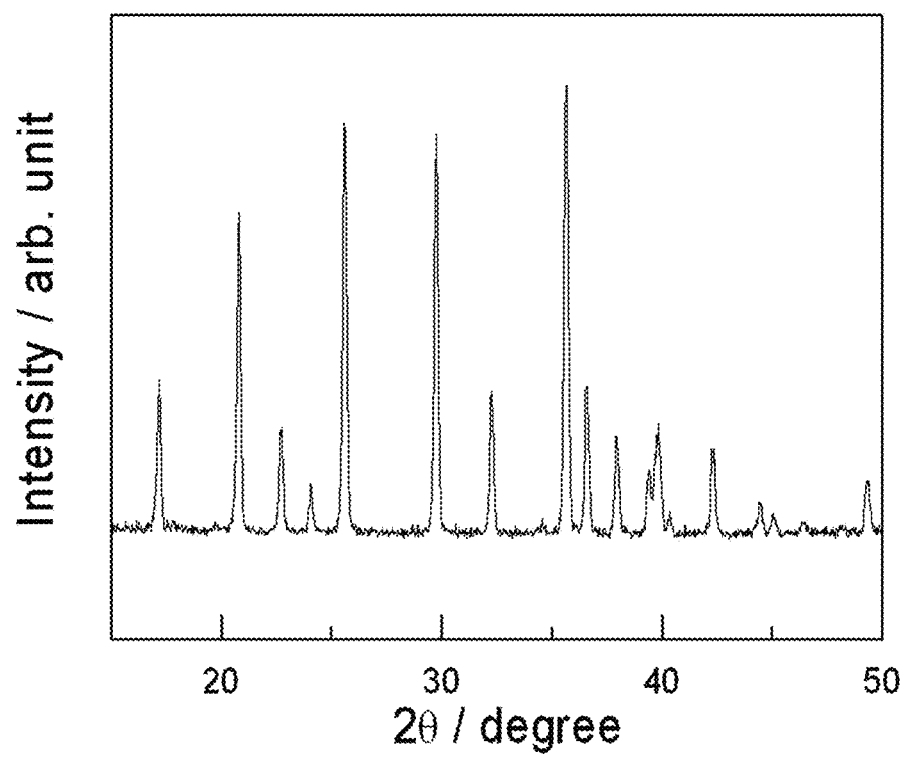
FIG. 22 is a graph showing X-ray diffraction analysis results of $LiFePO_4$ prepared according to Example 6.
Figure 23:
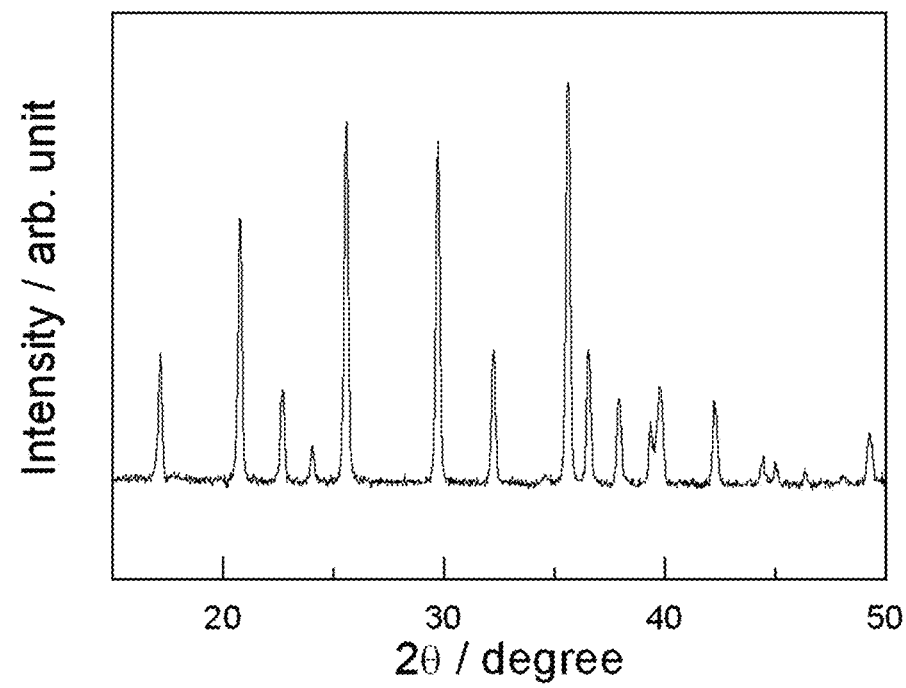
FIG. 23 is a graph showing X-ray diffraction analysis results of $LiFePO_4$ prepared according to Example 7.
Figure 24:
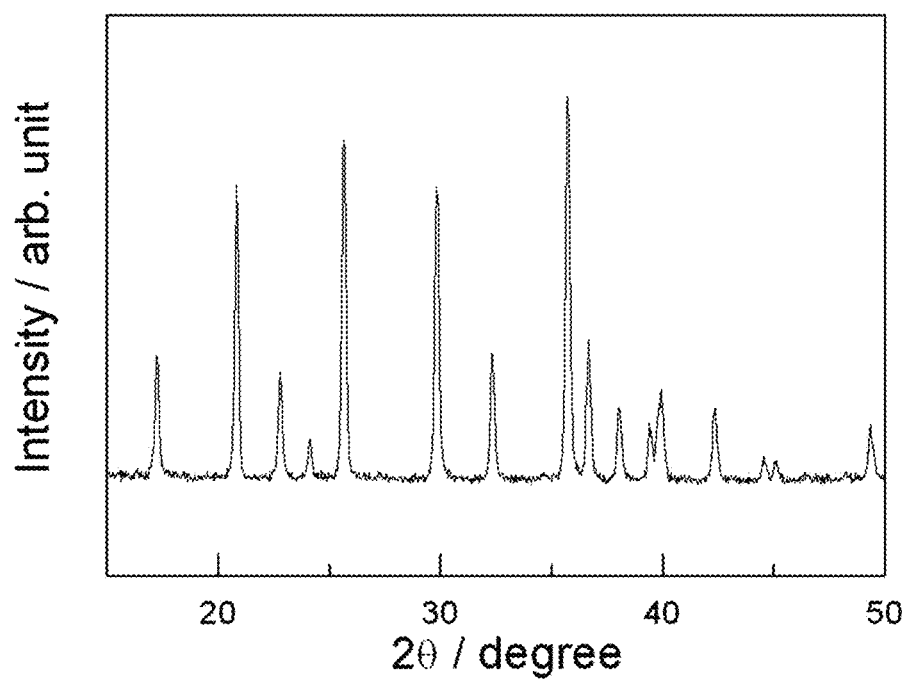
FIG. 24 is a graph showing X-ray diffraction analysis results of $LiFePO_4$ prepared according to Example 7.

Referring to FIGS. 22 to 24, the positive active materials of Examples 6 and 7 and Comparative Example 3 had the same peak as Card No. 29-0715 of JCPDS (Joint Committee on Powder Diffraction Standards), and were identified to be $LiFePO_4$.

Fabrication of a Lithium Battery

Each positive active material powder of Examples 1 to 7 and Comparative Examples 1 to 3 was mixed with acetylene black as a conductive material and polyvinylidene fluoride (PVdF) as a binder in a weight ratio of 85:7.5:7.5, preparing a slurry. The slurry was uniformly coated on a 20 µm-thick aluminum foil and vacuum-dried at 120° C., fabricating a positive electrode.

The positive electrode was used with a lithium foil as a counter electrode, a porous polyethylene film (Celgard LLC Co., Celgard 2300, thickness: 25 µm) as a separator, and an electrolyte solution prepared by dissolving $LiPF_6$ with 1M of a concentration in a solvent prepared by mixing ethylene carbonate and diethyl carbonate in a volume ratio of 1:1 to fabricate a coin cell.

Characteristic Evaluation of the Fabricated Lithium Batteries

Figure 25:
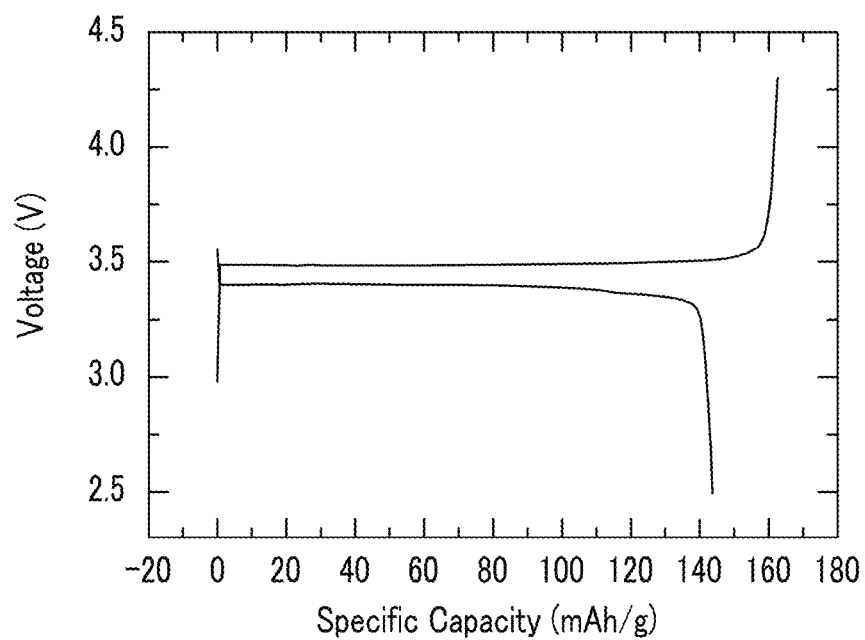
FIG. 25 is a graph showing capacity change of a battery including the olivine-type positive active material prepared according to Example 1 depending on its voltage change.
Figure 26:
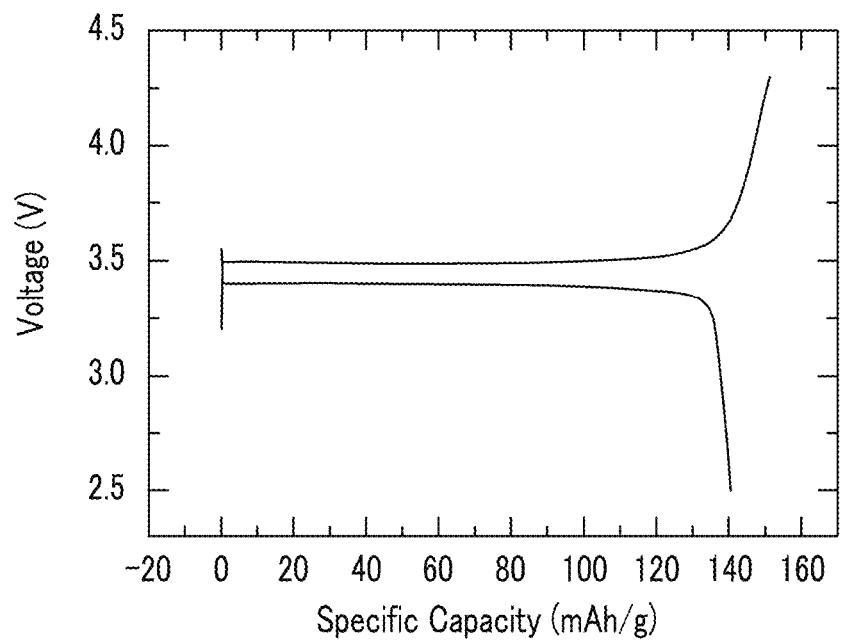
FIG. 26 is a graph showing capacity change of a battery including the olivine-type positive active material prepared according to Example 2 depending on its voltage change.
Figure 27:
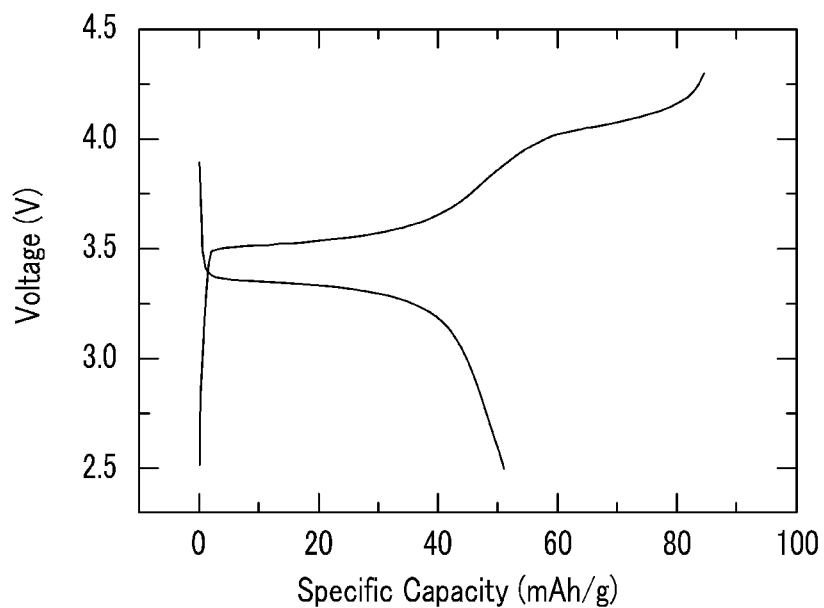
FIG. 27 is a graph showing capacity change of a battery including the olivine-type positive active material prepared according to Comparative Example 1 depending on its voltage change.

Each of the coin cells including the positive active material powder according to Examples 1 and 2 and Comparative Example 1 were evaluated through charge and discharge experiments at 30° in a potential region ranging from 2.5V to 4.3V at current density of 15 mA/cm2 using an electrochemical analyzer (Toyo System, Toscat 3100U). FIGS. 25 to 27 show the charge and discharge curve of each coin cell respectively including the olivine-type positive active material powders according to Examples 1 and 2 and Comparative Example 1.

Referring to FIGS. 25 to 27, when an olivine-type positive active material had a specific surface area of less than 1 $m^2/g$, the coin cell had deteriorated electrochemical characteristics.

Figure 28:
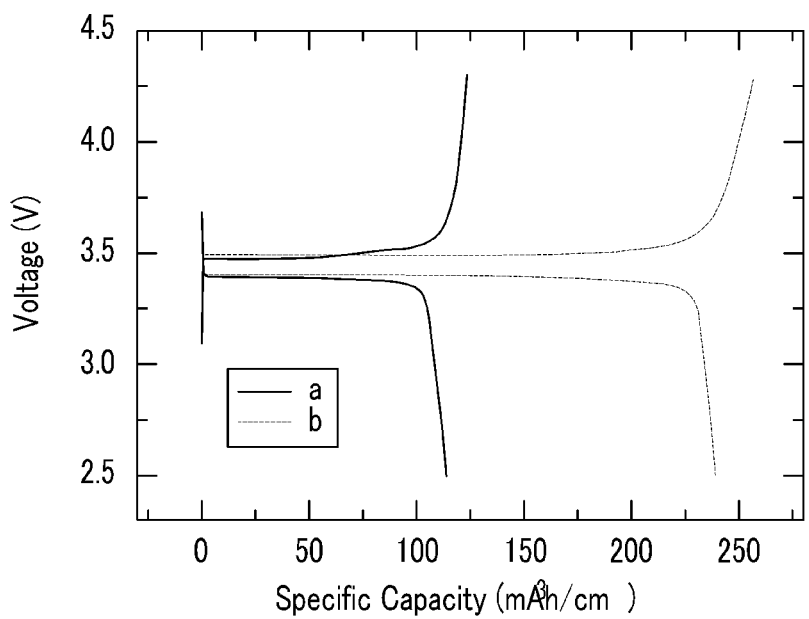
FIG. 28 is a graph showing capacity per unit volume of a battery respectively including the positive active materials according to Example 1 and Comparative Example 2.

In addition, FIG. 28 shows capacity per unit volume of each coin cell to evaluate electrochemical characteristics of the positive active material powder. Referring to FIG. 28, the positive active material powder of Example 1 had better capacity per unit volume than the one of Comparative Example 2.

Figure 29:
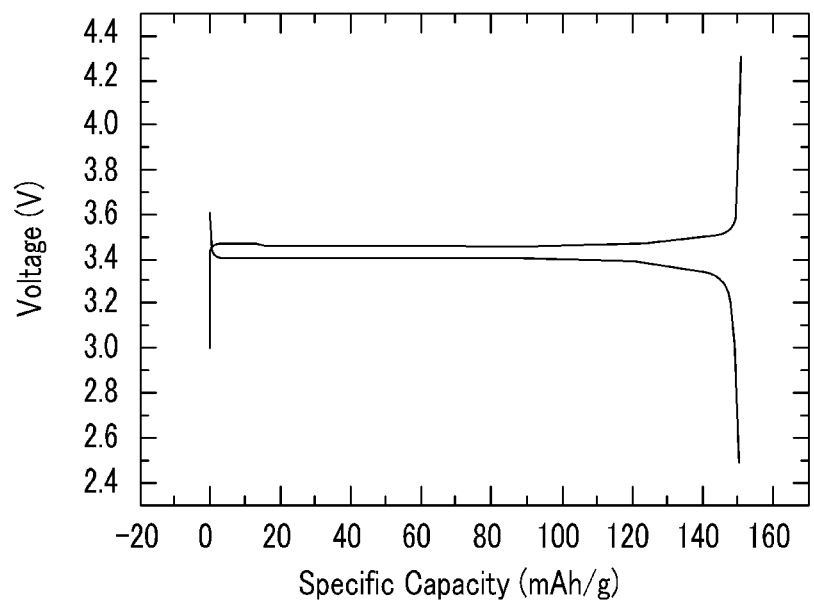
FIG. 29 is a graph showing capacity change of a battery including the olivine-type positive active material of Example 3 depending on its voltage.
Figure 30:
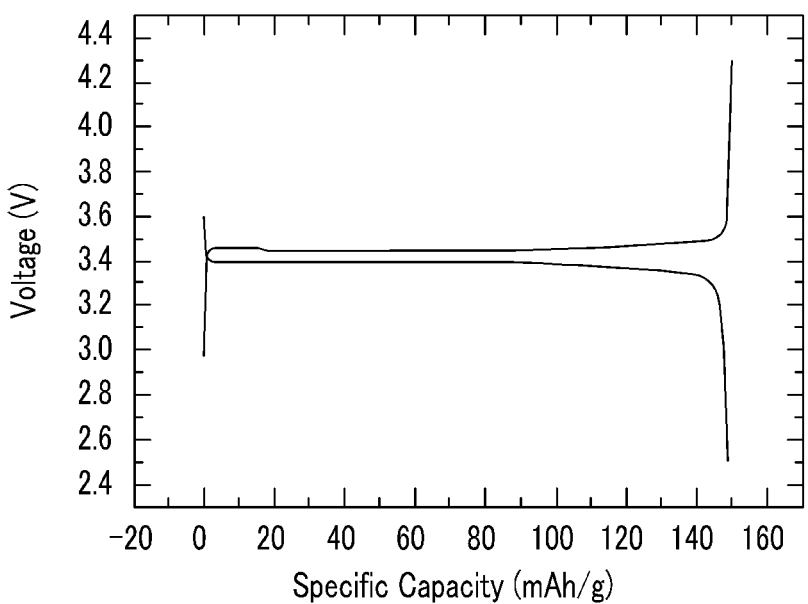
FIG. 30 is a graph showing capacity change of a battery including the olivine-type positive active material of Example 4 depending on its voltage.
Figure 31:
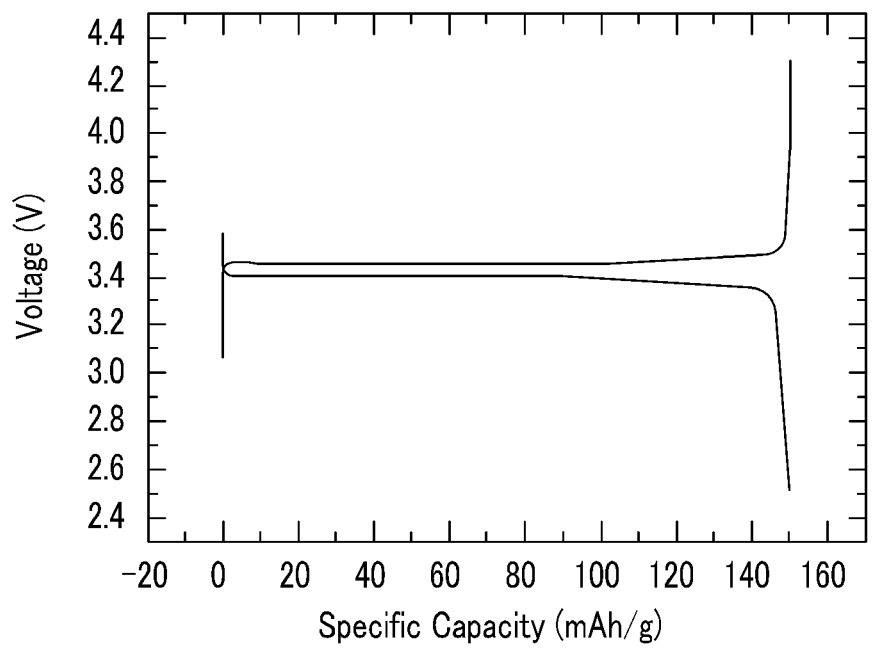
FIG. 31 is a graph showing capacity change of a battery including the olivine-type positive active material of Example 5 depending on its voltage.

Each of the coin cells respectively including the positive active material powders according to Examples 3 to 5 were experimentally evaluated regarding charge and discharge at 30° C. in a potential region ranging from 2.5V to 4.3V with a current density of 15 mA/cm2 using an electrochemical analyzer (Toyo System, Toscat 3100U). FIGS. 29 to 31 show charge and discharge curves of each coin cell including the olivine-type positive active material powder of Examples 3 to 5.

Referring to FIGS. 29 to 31 and 27, each coin cell including the positive active material powder of Examples 3 to 5 had larger capacity than one including the positive active material powder of Comparative Example 1.

Figure 32:
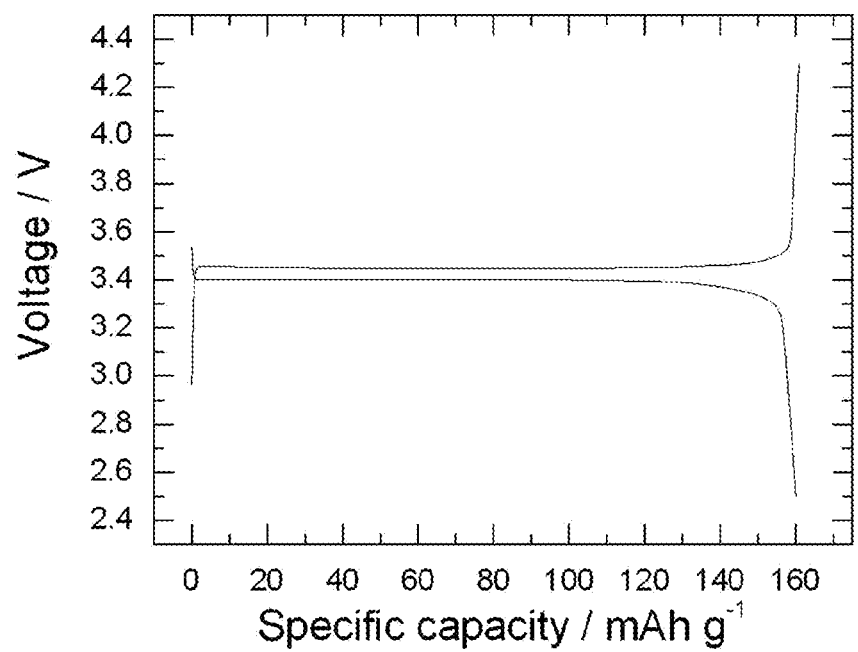
FIG. 32 is a graph showing a charge and discharge curve of $LiFePO_4$ prepared according to Example 6.
Figure 33:
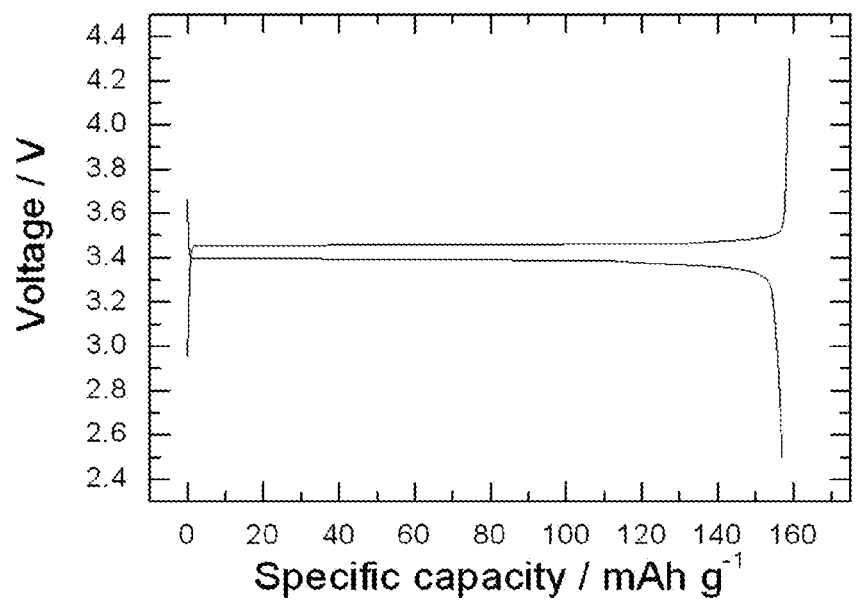
FIG. 33 is a graph showing a charge and discharge curve of $LiFePO_4$ prepared according to Example 7.
Figure 34:
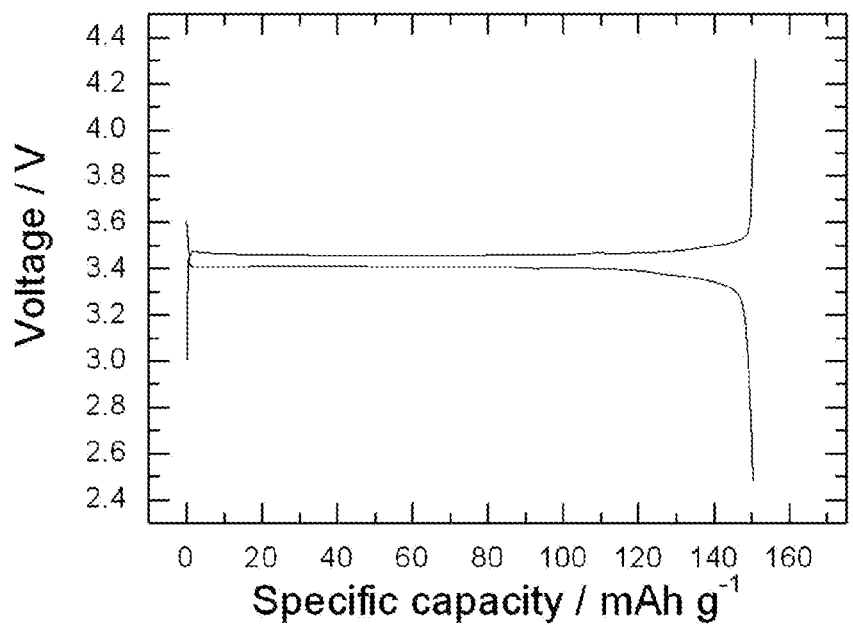
FIG. 34 is a graph showing a charge and discharge curve of LiFePO$_4$ prepared according to Comparative Example 3.

Next, each of the coin cells respectively including positive active material powders of Examples 6 and 7 and Comparative Example 3 were experimentally evaluated regarding charge/discharge at 30° C. in a potential region ranging from 2.5V to 4.3V with a current density of 15 mA/cm2 using an electrochemical analyzer (Toyo System, Toscat 3100U). FIGS. 32 to 34 show the charge and discharge curves of each coin cell respectively including the positive active material powders according to Examples 6 and 7 and Comparative Example 3. The coin cells including the positive active material powder of Examples 6 and 7 had better capacity than the one including the positive active material powder of Comparative Example 3.

Figure 35:
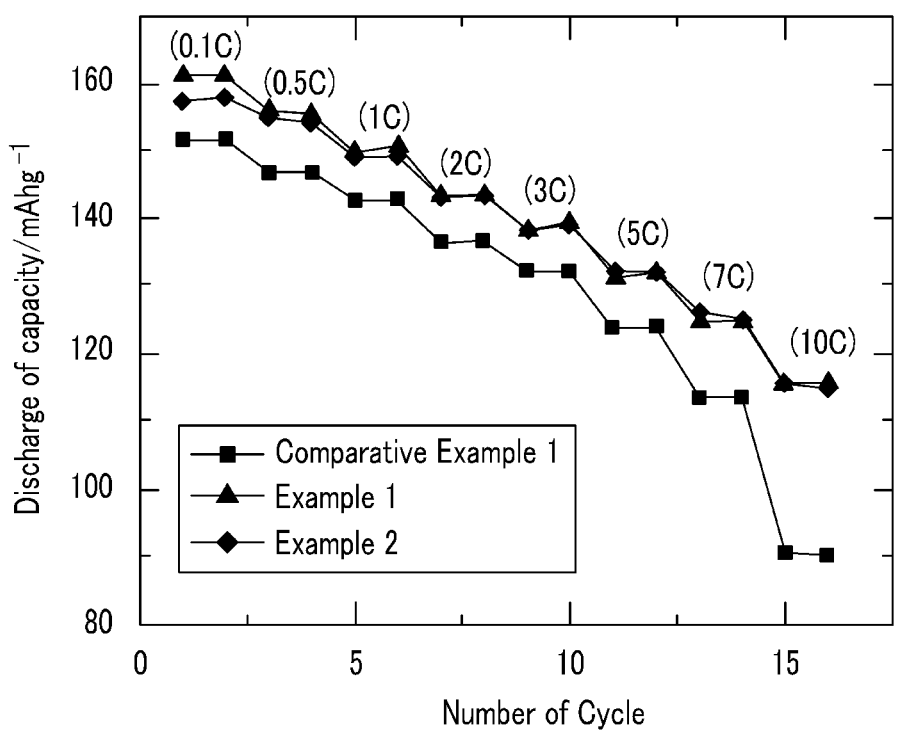
FIG. 35 is a graph showing high rate characteristics of LiFePO$_4$ prepared according to Examples 6 and 7 and Comparative Example 3.

In addition, FIG. 35 shows the high rate characteristic of each coin cell respectively including the positive active material powders according to Examples 6 and 7 and Comparative Example 3.

In other words, FIG. 35 shows a rate measurement graph of a half coin cell by experimentally evaluating the solid oxide composites of Examples 6 and 7 and Comparative Example 3 within a voltage ranging from 2.5-4.3V at each rate of 0.1 C, 0.5 C, 1 C, 2 C, 3 C, 5 C, 7 C, and 10 C during the discharge. The ones of Examples 6 and 7 had better characteristics than the one of Comparative Example 3 at a higher rate during the discharge. Since a primary particle, an olivine material with low conductivity, was coated with carbon and a secondary particle was uniformly coated with carbon on the surface, which sped up lithium ion diffusion, an olivine positive active material had improved electrochemical characteristics.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary in every way, but the present invention is not limited thereto.

The invention claimed is:

1. An olivine-type positive active material for a lithium battery comprising a plurality of particles represented by formula 1:

$$Li_xM_yM'_zXO_{4-w}B_w$$ [Formula 1]

(wherein, M and M' are independently Fe, Ni, Co, Mn, Cr, Zr, Nb, Cu, V, Ti, Zn, Al, Ga, Mg, B, and the combination thereof, X is one element selected from the group consisting of P, As, Bi, Sb, and the combination thereof, B is one element selected from the group consisting of F, S, and the combination thereof, $0 < x \leq 1$, $0 < y \leq 1$, $0 < z \leq 1$, $0 < x+y+z \leq 2$, and $0 \leq w \leq 0.5$)

wherein the particles have a diameter of 5 to 15 μm and a tap density of about 0.8 to about 2.1 g/cm³, and a specific surface area of about 1 to about 10 m²/g, the particle is a secondary particle having a plurality of primary particles, a first carbon coating layer is formed on the surface of the primary particle and a second carbon coating layer is formed on the surface of the secondary particle, and carbon is dispersed inside the primary particle.

2. The olivine-type positive active material for a lithium battery of claim 1, wherein the olivine-type positive active material has a particle diameter of 5 to 7 μm, and a tap density of 1.2 to 2.0 g/cm³.

3. The olivine-type positive active material for a lithium battery of claim 1, wherein the olivine-type positive active material is selected from the group consisting of the following Formula 2, Formula 3, Formula 4, Formula 5, and a combination thereof:

$$LiFe_{1-a}A_aPO_4$$ [Formula 2]

wherein A is an element selected from the group consisting of Ni, Co, Mn, Cr, Zr, Nb, Cu, V, Mo, Ti, Zn, Al, Ga, Mg, B, and a combination thereof, and $0 \leq a \leq 1$, $$Li_{1-a}A_aFePO_4$$ [Formula 3]

wherein A is an element selected from the group consisting of Ni, Co, Mn, Cr, Zr, Nb, Cu, V, Mo, Ti, Zn, Al, Ga, Mg, B, and a combination thereof, and $0 \leq a < 1$, $$LiFe_{1-a}A_aPO_{4-z}B_z$$ [Formula 4]

wherein A is an element selected from the group consisting of Ni, Co, Mn, Cr, Zr, Nb, Cu, V, Mo, Ti, Zn, Al, Ga, Mg, B, and a combination thereof, B is one element selected from the group consisting of F, S, and a combination thereof, $0 \leq a \leq 1$, and $0.01 \leq z \leq 0.5$, and $$Li_{1-a}A_aFePO_{4-z}B_z$$ [Formula 5]

wherein A is an element selected from the group consisting of Ni, Co, Mn, Cr, Zr, Nb, Cu, V, Mo, Ti, Zn, Al, Ga, Mg, B, and a combination thereof, B is one element selected from the group consisting of F, S, and a combination thereof, $0 \leq a < 1$, and $0.01 \leq z \leq 0.5$.

4. A lithium battery comprising the olivine-type positive active material according to claim 1.

* * * * *